(12) United States Patent
Lalonde et al.

(10) Patent No.: US 12,254,554 B2
(45) Date of Patent: Mar. 18, 2025

(54) OFFLOADING SHADER PROGRAM COMPILATION

(71) Applicant: NVIDIA Corporation, Santa Clara, CA (US)

(72) Inventors: Paul Albert Lalonde, Victoria (CA); Franck Diard, Roquefort les pins (FR); Patrick Neill, Sherwood, CO (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/680,171

(22) Filed: Feb. 24, 2022

(65) Prior Publication Data

US 2023/0281907 A1    Sep. 7, 2023

(51) Int. Cl.
*G06T 15/00* (2011.01)
*G06F 8/41* (2018.01)

(52) U.S. Cl.
CPC .............. *G06T 15/005* (2013.01); *G06F 8/41* (2013.01)

(58) Field of Classification Search
CPC ................................ G06T 15/005; G06F 8/41
See application file for complete search history.

(56) References Cited

U.S. PATENT DOCUMENTS

| | | |
|---|---|---|
| 10,423,463 B1 | 9/2019 | Wilt |
| 11,069,119 B1 | 7/2021 | Anderegg |
| 11,240,348 B2 | 2/2022 | Vlachogiannis et al. |
| 11,726,755 B2 | 8/2023 | Lalonde et al. |
| 2016/0070549 A1* | 3/2016 | Hall .......................... G06F 8/71 717/140 |
| 2016/0307364 A1 | 10/2016 | Fabius |
| 2017/0308364 A1* | 10/2017 | Munshi .................... G06F 8/456 |
| 2018/0286008 A1* | 10/2018 | Panneer ................ G06T 15/005 |
| 2019/0232164 A1 | 8/2019 | Griffais |
| 2019/0308099 A1 | 10/2019 | Lalonde et al. |
| 2020/0167985 A1 | 5/2020 | Brennan |
| 2021/0065441 A1 | 3/2021 | Colbert et al. |
| 2023/0376291 A1 | 11/2023 | Lalonde et al. |

FOREIGN PATENT DOCUMENTS

CN         107 426286 A      12/2017

OTHER PUBLICATIONS

Sitthi-Amorn et al., "An Improved Shading Cache for Modern GPUs", 2008, [Online], pp. 95-101, [Retrieved from internet on Feb. 24, 2023],<https://diglib.eg .org/bitstream/handle/10.2312/EGGH.EGGH08.095-101/095-101.pdf?sequence=1 &isAllowed=y> (Year: 2008).

* cited by examiner

*Primary Examiner* — Michelle Chin
(74) *Attorney, Agent, or Firm* — Lowenstein Sandler LLP

(57) ABSTRACT

Embodiments of the present disclosure are directed to apparatuses, systems, and techniques of offloading shader program compilation at a computing system. A detection is made that a set of shader programs are to be compiled for an application executing at a computing system using a first set of processing devices. A second set of processing devices to compile the set of shader programs is identified. Each of the second set of processing devices is different from any processing device of the first set of processing devices. The set of shader programs is provided for compilation using the second set of processing devices in view of state data associated with the computing system to obtain a set of complied shader programs. The set of compiled shader programs is executed using the first set of processing devices.

18 Claims, 17 Drawing Sheets

OFFLOADING SHADER PROGRAM COMPILATION

TECHNICAL FIELD

At least one embodiment pertains to processing resources used to perform and facilitate operations for offloading shader program compilation at a computing system. For example, at least one embodiment pertains to processors or computing systems used to provide and enable a set of shader programs for an application to be compiled using a different set of processing devices than the set of processing devices that is running the application, according to various novel techniques described herein.

BACKGROUND

Shader programs are programs typically executed by a specialized co-processors to perform particular tasks for an application running at a computing system. For example, shader programs may be executed by a graphics processing unit to render graphics for an application. In another example, shader programs may be executed by a processing device to perform general purpose computing tasks on a graphics processing unit (GPU) for machine learning tasks. However, while specialized co-processors are well-suited to executing shader programs, the same co-processors typically cannot, or cannot efficiently compile the shader programs themselves. As a result, a general-purpose processor is typically used to compile shader programs, and the specialized co-processor are thereafter used to execute the compiled shader program once the shader program is referenced by the application. An application may reference thousands or hundreds of thousands of distinct shader programs during application runtime, which each may take a significant amount of time to compile. Shader programs of an application may be compiled using one or more processing devices that are running the application at or around the time that the application references the shader program. However, compiling shader programs using the same processing device(s) used to run the application can cause delays in execution of the application and/or the shader programs (e.g., delays in graphics rendering), which can be noticeable by a user of the computing system.

BRIEF DESCRIPTION OF DRAWINGS

Various embodiments in accordance with the present disclosure will be described with reference to the drawings, in which.

DETAILED DESCRIPTION

Figure 1A:
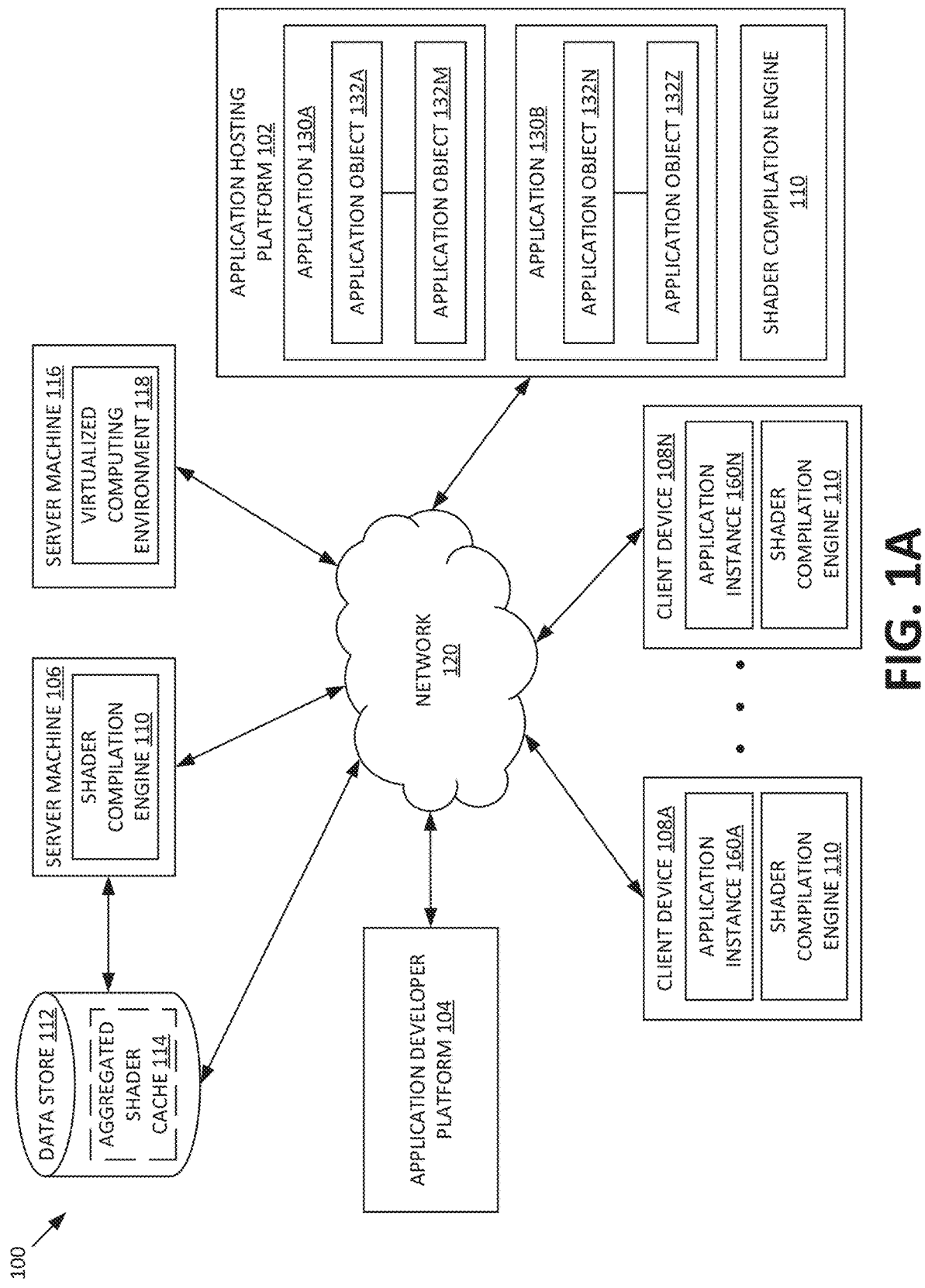
FIG. 1A is a block diagram of an example system architecture, according to at least one embodiment.

Shader programs are programs typically executed by co-processors (e.g., a graphics processing unit (GPU), a central processing unit (CPU), etc.) to perform particular tasks (e.g., render graphics, perform general purpose computing tasks, perform machine learning tasks, etc.) for applications running at a computing system. Generally, a compiler may compile a shader program before or after the shader program is referenced for execution by the application. The compiled shader program may be specific to the particular type of hardware (e.g., the processing device) supporting the application at the computing system, a type or version of a driver running on the system hardware, etc. In conventional computing systems, shader programs are compiled using the same processing device (or set of processing devices) that executes instructions for the application running at the computing system. Compiling a shader program may take a significant amount of time (e.g., several milliseconds or longer) and consume a significant amount of computing resources (e.g., processing cycles, random access memory, etc.), which limits the resources available for running the application using the processing device(s). Some applications may reference thousands or hundreds of thousands of distinct shader programs during application runtime. As indicated above, the processing device(s) may compile shader programs for an application before and/or in response to the application referencing the shader programs (e.g., during the application runtime, etc.). However, compiling shader programs using the same processing device(s) used to run the application may be inefficient, and can cause delays in the performance of particular tasks (e.g., graphics rendering, etc.), which may be noticeable by a user of the computing system.

In addition, shader programs are frequently compiled at conventional computing systems to meet minimum operating and/or performance conditions associated with running the application. For example, shader programs are compiled at some conventional systems such as to simply render a particular graphic, without satisfying optimal and/or even target rendering conditions (e.g., efficiency conditions, latency conditions, rendering quality conditions, etc.) for the application. Compiled shader programs that only meet minimum operating and/or performance conditions may not be optimized for efficient utilization of the computing system resources during execution. Shader programs that are compiled to satisfy optimal and/or target rendering conditions may consume a smaller amount of system resources. Accordingly, shader programs that are compiled to meet minimum operating and/or performance conditions can consume a significant amount of system resources when such compiled shader programs are executed, which can cause further delays in the performance of particular tasks (e.g., graphics rendering, etc.), as well as contribute to a decrease in overall system efficiency and/or throughput and an increase in overall system latency.

Embodiments of the present disclosure address the above and other deficiencies by providing a technique for offloading shader program compilation from processing device(s) used for running an application at a computing system. In some embodiments, an application can refer to a set of programs associated with performing a particular set of tasks for a computing system. In one illustrative example, the computing system can correspond to a client device and the application can be a set of programs associated with a video game that is running on the client device. In another illustrative example, the computing system can correspond to a cloud-computing device and the application can be a set of programs associated with a video game that is running on the cloud-computing device and streamed (e.g., via a network) to a client device that is connected to the cloud-computing device. In additional or alternative embodiments, an application can refer to a set of programs associated with performing multiple sets of tasks for the computing system. In one illustrative example, the application can be a set of programs associated with multiple different video games that is executed via a cloud-computing device and streamed to multiple different client devices (e.g., via one or more networks). In yet additional or alternative embodiments, an application can refer to an application programming interface (API) that is provided by a platform (e.g., a gaming platform) and provides a graphical user interface (GUI) to a client device to enable a user to access the application.

In some embodiments, a component of a computing system (e.g., a shader engine, etc.) may detect that a set of shader programs for an application running using one or more first processing devices of the computing system are to be compiled. In one example, the first processing device(s) may correspond to one or more general-purpose processors—such as central processing units (CPUs)—for the computing system (e.g., the client device, the cloud-computing device, etc.). The shader engine may identify one or more second processing devices (e.g., co-processors) that are different from the first set of processing devices to compile the shader programs. In some embodiments, the second processing device(s) may include processing devices (e.g., a CPU, a graphics processing unit (GPU), a data processing unit (DPU) etc.) residing at a different computing system than the computing system that includes the first processing device(s) (e.g., are remote from the first processing device(s)). For example, the first processing device(s) may reside on a client device and the second processing device(s) can reside on a cloud-computing device that is connected to the client device via a network. In another example, the first processing device(s) may reside on a first cloud-computing device and the second processing device(s) can reside on a second cloud-computing device. In other or similar embodiments, the second processing device(s) may include processing devices residing at the same computing system that includes the first processing device(s). For example, the first processing device(s) can include one or more CPUs, GPUs, etc. at the computing system that are associated with executing the application. The second processing device(s) may include one or more additional CPUs, GPUs, etc. at the computing system that are not associated with executing the application. The shader engine (also referred to as a shader compilation engine herein) may identify the second processing device(s) in response to determining that a processing state (e.g., a processing capacity, a processing latency, a processing throughput, a number of shader programs of the set of shader programs, etc.) of the first processing device(s) does not satisfy a processing criterion (e.g., a processing capacity condition, etc.) associated with the application, in some embodiments.

Responsive to identifying the second processing device(s), the shader engine can provide the shader programs for compilation using the second processing device(s) in view of state data associated with the computing system. The state data can include a pipeline state of the computing system, a hardware state of the computing system, a driver state of the computing system, etc. If the second processing device(s) are remote from the computing system, the shader engine can obtain the state data for the computing system and can transmit the shader programs and/or the state data to the computing system including the second processing device(s) via a network, in some embodiments. The shader engine can obtain the compiled shader programs based on the compilation using the second processing device(s) and execute the obtained set using the first processing device(s). In some embodiments, the first processing device(s) can execute one or more instructions associated with the application while the second processing device(s) compile the shader programs.

In some embodiments, the first processing device(s) can compile the shader programs (e.g., in response to detecting that the application has initially referenced the set of shader programs) such that the compiled shader programs meet minimum operating and/or performance conditions associated with running the application. In one example, the minimum operating and/or performance conditions can correspond to conditions relating to simply rendering a graphic for the application without optimizing to maximize a quality of the rendered graphic, maximizing an efficiency of executing the compiled shader program, minimizing a latency of executing the compiled shader program, etc. The shader engine can detect that the shader programs are to be re-compiled to meet target and/or optimal conditions (e.g., rendering quality, efficiency conditions, latency conditions, etc.) for running the application. The shader engine can identify the second processing device(s) for re-compiling the shader programs and provide the shader programs for compilation using the second processing device(s), as described above. In some embodiments, the shader engine can provide optimization parameters with the shader programs and/or the state data. The optimization parameters can include compilation parameters that correspond to the target and/or optimal conditions. The second processing device(s) can re-compile the shader programs in view of the provided optimization parameters, in some embodiments. The re-compiled shader programs can be an optimized version of the shader programs that were compiled by the first processing device(s). In response to obtaining the optimized compiled shader programs, the shader engine can replace shader programs compiled by the first set of processing devices with the optimized compiled shader programs and execute the optimized compiled shader programs (e.g., in response to detecting the application has referenced the shader programs, etc.).

Aspects and embodiments of the present disclosure enable offloading shader compilation from processing device(s) running an application at a computing system. Rather than compiling each shader program using the same processing device(s) that are executing an application, embodiments of the present disclosure provide a technique for isolating shader programs from other instructions of the application and providing the shader programs for compilation using processing device(s) that are separate (e.g., at the computing system or remote from the computing system) from processing device(s) used to run the application. By providing the shader programs for compilation using the separate processing device(s), more computing resources (e.g., processing cycles, memory space, etc.) are available for the processing device(s) associated with executing the application, which can improve a performance of the application and can improve an overall efficiency and decrease an overall latency for the computing system. In addition, embodiments of the present disclosure provide a mechanism for compiling optimized versions of shader programs (e.g., using the separate processing device(s)) without consuming additional resources associated with the processing device(s) allocated to execute the application. By enabling the compilation of the optimized versions of the shader programs, a fewer amount of system resources are consumed during execution of such shader programs, which further improves an overall efficiency and decreases an overall latency for the computing system.

System Architecture

FIG. 1A is a block diagram of an example system architecture 100, according to at least one embodiment. The system architecture 100 (also referred to as "system" herein) includes application hosting platform 102, application developer platform 104, server machine 106, client devices 108A-N (collectively and individually referred to as client device(s) 108), and data store 112, each connected to a network 120. In some embodiments, system architecture 100 may additionally include server machine 116. In implementations, network 120 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 112 is a persistent storage that is capable of storing content items as well as data structures to tag, organize, and index the content items. Data store 112 may be hosted by one or more storage devices, such as main memory, magnetic or optical storage based disks, tapes or hard drives, NAS, SAN, and so forth. In some implementations, data store 112 may be a network-attached file server, while in other embodiments data store 112 may be some other type of persistent storage such as an object-oriented database, a relational database, and so forth, that may be hosted by platform 102 or one or more different machines coupled to the platform 102 via a network 120.

Application hosting platform 102 may be configured to host one or more applications (e.g., application 130A, application 130B, etc.) provided by an application developer (e.g., via application developer platform 104). Application developer platform 104 may be used by an application developer (e.g., a user, company, organization, etc.). For example, an application developer may be a video game developer that develops a video game (represented by an application 130) for users to interact with on client devices 108. Application hosting platform 102 may provide users with access to an application 130 (or an instance of application 130) developed by application developer platform 104 via a respective client device 108A-N. For example, application hosting platform 102 may allow users to consume, upload, download, and/or search for applications 130. In some embodiments, application hosting platform 102 may include a website (e.g., one or more webpages) that may be used to provide users with access to applications 130. In other or similar embodiments, client devices 108 may be virtualized and have a virtual system running an instance 160 of application 130 (e.g., as part of a virtual machine, a container, a process, etc.). It should be noted that although some embodiments of the present disclosure are described with respect to an instance 160 of application 130 running on a virtualized client device 108, embodiments of the present disclosure may also be applied to applications 130 running on a client device 108 that is not virtualized. Similarly, embodiments of the present disclosure that are directed to an application 130 running on a client device 108 that is not virtualized may also be applicable for an instance 160 of application 130 running on a virtualized client device 108.

In other or similar embodiments, client devices 108 may access application 130 via a virtualized computing environment 118 of server machine 116. For example, one or more computing devices of server machine 116 may be virtualized and have a virtual system running an instance of application 130 (e.g., as a part of a virtual machine, a container, a process, etc.). Server machine 116 may transmit data associated with the instance 160 of application 130 to client device 108 via network 120. Client device 108 may access the instance 160 of application 130 based on the transmitted data. Virtualized computing environment 118 may be provided and/or accessible by application hosting platform 102, in some embodiments.

Each application 130 may consist of one or more application objects (e.g., application objects 132A-M of application 130A, application objects 132N-132Z of application 130B, etc.). In some embodiments, application hosting platform 102 may render each application object 132 (e.g., at client device 108, via a cloud-computing device, such as server machine 116, etc.) for display via a user interface (UI) at each client device 108 running an instance of a respective application 130 (e.g., application instance 160). Each application object 132 may be provided for application 130 by an application developer via application developer platform 104. A user of the respective client device 108 may interact with the instance 160 of application 130 by engaging with a rendered application object 132 via the client device UI, in some embodiments. In an illustrative example, applications 130A and 130B may be video game applications developed by a video game developer. Application objects 132 may be components of a respective video game application (e.g., a gaming object, a gaming map, etc.) that are rendered for display at a UI of a client device 108 running the instance 160 of the respective video game application. A user of client device 108 may engage with (e.g., consume, interact, etc.) the rendered application object 132 in order to progress through the video game via the respective client device 108.

It should be noted that although some embodiments and/or examples of the present disclosure describe a shader program as being used to render graphics for an application, embodiments and/or examples of the present disclosure may be applied to shader programs that are used to perform any type of task. For example, embodiments and/or examples of the present disclosure may be applied to shader programs that are used to perform general computing tasks, machine learning tasks, etc.

The client devices 108 may include devices, including but not limited to: televisions, smart phones, cellular telephones, personal digital assistants (PDAs), portable media players, netbooks, laptop computers, electronic book readers, tablet computers, desktop computers, set-top boxes, gaming consoles, and the like. The individual client devices 108 may include a content viewing component (not shown) that enables a user of client device 108 to consume application objects 132 of an application 130. The content viewing component may be hosted by application hosting platform 102 and may provide a rendered version of the application object 132 for presentation via the UI of a client device 108 during a runtime of the application 130. In some embodiments, client device 108 may have a virtual system running an instance of application 130. The content viewing component may be part of the virtual system and may provide the rendered version of the application object 132, in accordance with embodiments described herein.

As described above, application hosting platform 102 may render one or more application objects 132 of an application 130, or an instance 160 of an application 130, running at client device 108. In some embodiments, the content viewing component at the client device 108 may render an application object 132 by executing one or more programs (referred to as shader programs) at the client device. Each shader program may include a set of operations that enable the content viewing component to render an application object 132 for presentation via the UI of a client device 108. During a runtime of the application 130 at the client device 108, the application 130 may reference an application object 132 that is to be presented via the UI of the client device 108. The shader manager may identify one or more shader programs associated with the referenced application object 132 and may render the referenced application object 132 by executing a compiled version of the one or more shader programs.

In some embodiments, the shader programs for an application can be stored in a data store (e.g., data store 112) that is accessible by application hosting platform 102 (e.g., via network 120). In other or similar embodiments, application hosting platform 102 and/or a component associated with application hosting platform 102 (e.g., shader compilation engine 110, etc.) may download one or more shader programs associated with an application to a client device 108 that is running the application 130, or an instance 160 of the application 130. One or more components running on the client device (e.g., shader compilation engine 110) can store the shader programs in a memory of the client device 108, in some embodiments.

Shader compilation engine 110 may compile shader programs for application 130 to be executed (e.g., by client device 108, by application hosting platform 102, etc.) for rendering an application object 132, as described above. Instructions for application 130 (and/or application instance 160) may be executed using a first set of processing devices residing on client device 108, platform 102, server machine 116, etc., in accordance with previously described embodiments. In some embodiments, the first set of processing devices can include one or more CPUs, GPUs, etc. In some embodiments, shader compilation engine 110 can facilitate compilation of one or more shader programs for application 130 before the shader programs are referenced during execution of application 130. For example, when application 130 and/or application instance 160 is initialized (e.g., at client device 108, platform 102, server machine 116, etc.), shader compilation engine 110 may identify one or more shader programs that are to be compiled for application 130, obtain the identified shader programs (e.g., from data store 112, from the memory of client device 108, etc.), and can cause the identified shader program(s) to be compiled (e.g., during initialization of application 130). In another example, during execution of application 130 and/or instance 160, shader compilation engine 110 can detect (e.g., based on one or more instructions for executing application 130, based on a notification received from platform 102, etc.) that a particular set of shader programs are to be referenced by application 130 within a particular time period. Shader compilation engine 110 can obtain the particular set of shader programs (e.g., from data store 112, from the memory of client device 108, etc.) and can cause them to be compiled before such shader programs are referenced by application 130 and/or instance 160, in some embodiments. In other or similar embodiments, shader compilation engine 110 can cause shader programs to be compiled in response to detecting that application 130 and/or instance 160 has referenced such shader programs.

As indicated above, application 130 and/or instance 160 can run on a first set of processing devices. Shader compilation engine 110 can identify a second set of processing devices to compile the shader program(s) and can provide the shader program(s) for compilation via the identified second set of processing devices. The second set of processing devices can include one or more processing devices that are distinct from each of the first set of processing devices. For example, the first set of processing devices can reside at a first computing system (e.g., client device 108, etc.). Shader compilation engine 110 can identify the second set of processing devices from processing devices at a second computing system (e.g., server machine 116, etc.). In another embodiment, the shader compilation engine 110 can identify the second set of processing devices from additional processing devices residing at the first computing system. Such processing devices may not be associated with executing application 130 and/or instance 160. The second set of processing devices can include one or more CPUs, GPUs, DPUs, etc., in some embodiments. In some embodiments, shader compilation engine 110 may identify the second set of processing devices based on a hierarchy of processing devices to be used to compile shader programs (e.g., provided by an application developer via application developer platform 104, provided by an operator or a developer associated with application hosting platform 102, etc.). In other or similar embodiments, shader compilation engine 110 may identify the second set of processing devices by determining that the second set of processing devices includes a sufficient amount of resources to compile the shader programs. Further details regarding identifying the second set of processing devices are provided herein.

Responsive to identifying the second set of processing devices, shader compilation engine 110 can provide the shader programs for compilation via the second set of processing devices. In some embodiments, shader compilation engine 110 can transmit the shader programs or their identifiers (e.g., links or uniform resource locators (URLs)) to the computing system that hosts the second set of processing devices via network 120. In other or similar embodiments, shader or compilation engine 110 can transmit the shader programs to the second set of processing devices via a connection (e.g., a bus) between the first set of processing devices and the second set of processing devices.

The second set of processing devices can compile the shader programs. In some embodiments, the second set of processing devices can compile the shader program(s) in view of state data associated with the computing system that is running application 130 and/or instance 160. For example, the second set of processing devices can compile the shader programs in view of a pipeline state of the computing system that is running application 130, a hardware state of the computing system, a driver state of the computing system, and so forth. In some embodiments, shader compilation engine 110 may provide an indication of the state associated with the computing system with the shader program(s). In other or similar embodiments, the second set of processing devices may obtain the state data via a memory that is accessible by the second set of processing devices and shader compilation engine 110 (e.g., data store 112, etc.). Responsive to compiling the shader programs, the computing system associated with the second set of processing devices can transmit the compiled shader programs to shader compilation engine 110. In some embodiments, the computing system can transmit the compiled shader programs via network 120 or a bus. Shader compilation engine 110 can obtain the compiled shader programs from the second set of processing devices and can cause the compiled shader programs to be executed (e.g., in response to application 130 and or instance 160 referencing the shader programs).

In some additional or alternative embodiments, shader compilation engine 110 can cause the shader programs to be compiled via the first set of processing devices. For example, shader compilation engine 110 may detect that application 130 and/or instance 160 has referenced, or is going to reference, a shader program that has not yet been compiled. Shader compilation engine 110 can cause the shader program to be compiled via the first set of processing devices and can provide the compiled shader program for execution, in accordance with the application reference. Compiled shader programs that are compiled via the first set of processing devices may only meet a minimum operating condition and/or a minimum performance condition associated with application 130, in some embodiments. In some embodiments, the shader compilation engine 110 can identify the second set of processing devices, as described above, and can provide the shader program and a set of optimization parameters to the second set of processing devices. The optimization parameters can include one or more settings for the compiler running on the second set of processing devices that, when applied during compilation of the shader programs, cause the compiled shader programs to satisfy optimal and or target performance conditions associated with application 130. Accordingly, the compiled shader programs that are compiled via the second set of processing devices can be an optimized version of the compiled shader programs that are compiled via the first set of processing devices. Responsive to obtaining the optimized compiled shader programs from the second set of processing devices, shader compilation engine 110 can cause the first set of processing devices to execute the optimized compiled shader programs instead of the initially compiled shader programs (e.g., in response to an additional reference to the shader programs by the application 130).

As illustrated in FIG. 1A, shader compilation engine 110 can reside on each client device 108 connected to platform 102 via network 120, in some embodiments. In other or similar embodiments, shader compilation engine 110 can reside on a cloud-computing device, such as server machine 106. In some embodiments, one or more components of the cloud-computing device (not shown) can maintain an aggregated shader cache 114. The aggregated shader cache 114 can be a repository of shader programs that are compiled by processing devices associated with system 100. Aggregated shader cache 114 can reside at data store 112, in some embodiments. In response to a processing device compiling a shader program, the processing device can provide the shader program to shader compilation engine 110 (or another component provided by platform 102) and shader compilation engine 110 can store the compiled shader program at aggregated shader cache 114. In response to detecting that application 130 and/or instance 160 is to reference a particular shader program, shader compilation engine 110 can determine whether the compiled version of the shader program is included in aggregated shader cache 114. In response to determining that the compiled version of the shader program is stored in the aggregated shader cache 114, shader compilation engine 110 can obtain the compiled version of the shader program and can transmit the compiled version of the shader program for execution by the first set of processing devices, in accordance with previously described embodiments. Further details about shader compilation engine 110 and aggregated shader cache 114 are provided herein.

Figure 1B:
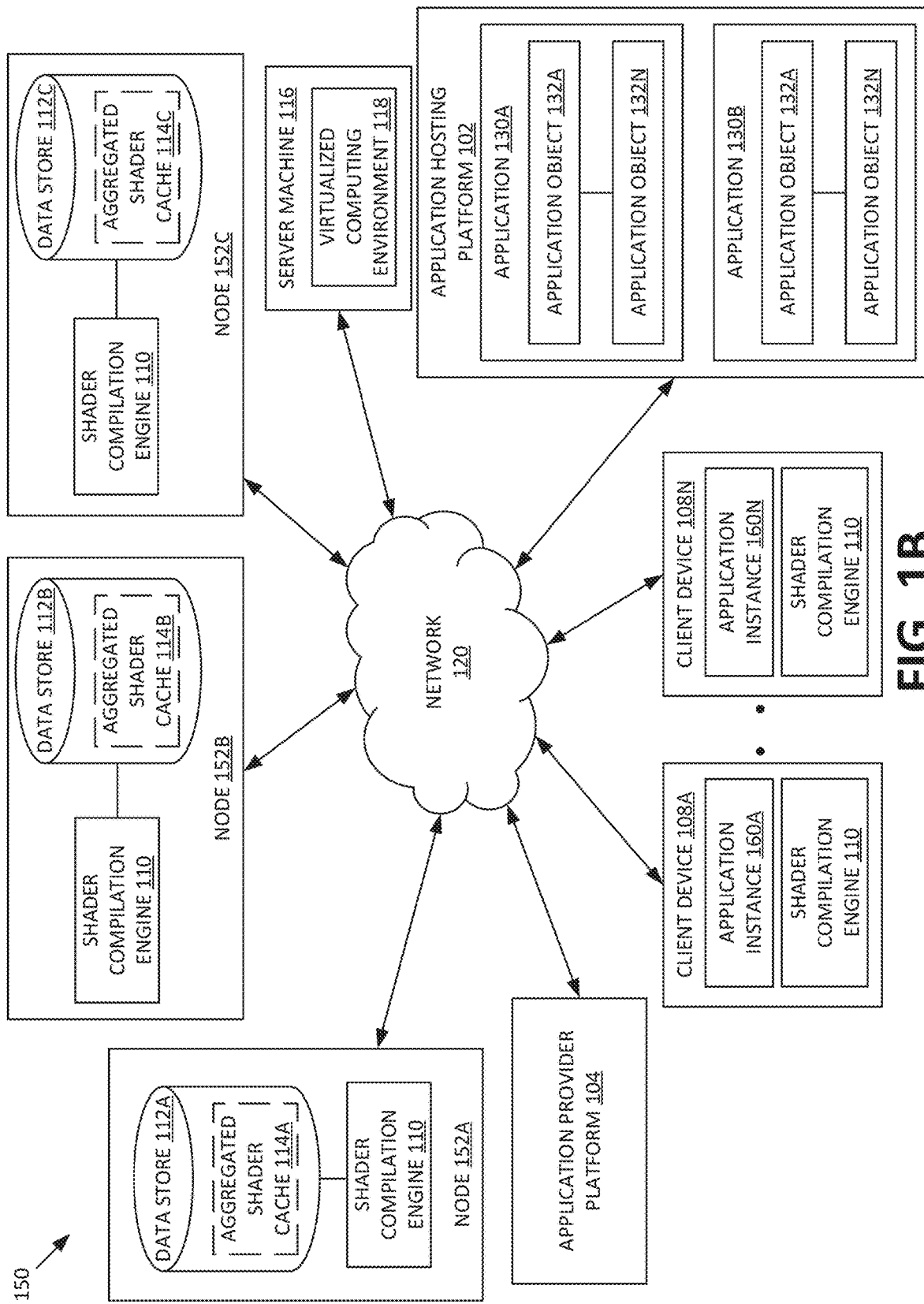
FIG. 1B is a block diagram of another example system architecture, according to at least one embodiment.

FIG. 1B is a block diagram of another example system architecture 150, according to at least one embodiment. In some embodiments, system architecture 150 includes application hosting platform 102, application provider platform 104, nodes 152, and client devices 108, each connected to a network 120, as described with respect to FIG. 1A. In additional or alternative embodiments, system architecture 150 may further include server machine 116, which provides a virtualized computing environment 118, in accordance with previously described embodiments. Each node 152 may be a grouping of hardware resources and/or software resources that are allocated to service one or more client devices 108 coupled to application hosting platform 102. In some embodiments, each node 152 may include a shader compilation engine, such as shader compilation engine 110. For example, each of nodes 152A-C may include a shader compilation engine 110, as illustrated in FIG. 1B. The shader compilation engine 110 residing on a respective node 152 may be configured to facilitate compilation of shader programs for an application 130 (or application instance 160) running via a client device 108 that is supported by the respective node. For example, shader compilation engine 110 residing on node 152A may be configured to facilitate compilation of shader programs for application instance 160A running on client device 108A. In another example, shader compilation engine 110 residing on node 152B and/or node 152C may be configured to facilitate compilation of shader programs for application instance 160N residing on client device 108N.

Each node 152 may further include a data store, such as data store 112, that stores one or more portions of aggregated shader cache 114. In an illustrative example, node 152A may include data store 112A, node 152B may include data store 112B and node 152C may include data store 112C. Data stores 112A-C may each be configured to store one or more portions of aggregated shader cache 114 (e.g., shader cache portions 114A-C, respectively). In some embodiments, each data store 112A-C may be configured to store the entire aggregated shader cache 114. In other or similar embodiments, each data store 112A-C may be configured to store a portion of shader cache 114 that is smaller than the entire shader cache 114. For example, each portion of aggregated shader cache 114 at a respective node 152 may include a distinct portion of aggregated shader cache 114. In such embodiments, each portion of aggregated shader cache 114 at a respective node 152 may include shader programs that are compiled for applications 130 running via client devices 108 that are serviced by the respective node 152. As indicated above, the shader compilation engine 110 at the respective node 152 may be configured to provide facilitate compilation of shader programs for applications 130 and/or instances 160 running via client devices 108 serviced by the respective node 152. For example, if a client device 108A and a client device 108B are serviced by the resources of node 152A and a client device 108C is serviced by the resources of node 152B, shader compilation engine 110 at node 152A may facilitate compilation of shader programs for the applications running via client devices 108A and 108B and may not facilitate compilation of shader programs for the applications running via client device 108C. Additionally, shader compilation engine 110 at node 152B may facilitate compilation of shader programs for applications 130 running via client device 108C and may facilitate compilation of shader programs for applications 130 running via client devices 108A and 108B.

As each shader program is compiled (e.g., for the applications 130 running via client devices 108A-C), shader compilation engine 110 (or another component of nodes 152) may store the compiled version of such shader program at the aggregated shader cache 114 associated with a respective node. For example, shader compilation engine 110 supporting client devices 108A and 108B may store compiled versions of shader programs that have been referenced by applications running on such client devices at aggregated shader cache 114A. In some embodiments, shader compilation engine 110 may validate each compiled shader program before such compiled shader programs are added to the aggregated shader cache. Shader compilation engine 110 may validate a compiled shader program by verifying that the compiled shader program is, in fact, the compiled version of the shader program. For example, shader compilation engine 110 may compare the compiled version of the shader program received from client device 108A to another compiled version of the shader program received from another client device 108B. If the compiled version received from client device 108B matches (or approximately matches) the compiled version received from client device 108B, shader compilation engine 110 may determine that the compiled version of the shader program is valid and may add the compiled version of the shader program to aggregated shader cache 114A. In another example, shader compilation engine 110 may determine that the compiled version of the shader program is valid by determining that the compiled version matches (or approximately matches) a threshold number of compiled versions of the shader programs (e.g., received from a threshold number of client devices 108 supported by node 152).

In some embodiments, shader compilation engine 110 (or another component of node 152) may transmit the compiled shader programs received from supported client devices 108 to other nodes 152 to be used to update respective aggregated shader caches 114. For example, shader compilation engine 110 residing on node 152A may receive (and validate) compiled versions of shader programs from client devices 108A and 108B. Shader compilation engine 110 can transmit the compiled versions of the shader programs to shader compilation engine 110 (or another component) of nodes 152B and/or 152C to be added to aggregated shader caches 114B and/or 114C. Accordingly, client devices 108C and/or other client devices 108 supported by nodes 152B and/or 152C can access the compiled versions of the shader programs, even if the application 130 (or application instances 160) running on such client devices 108 have not yet referenced the shader programs.

Figure 2:
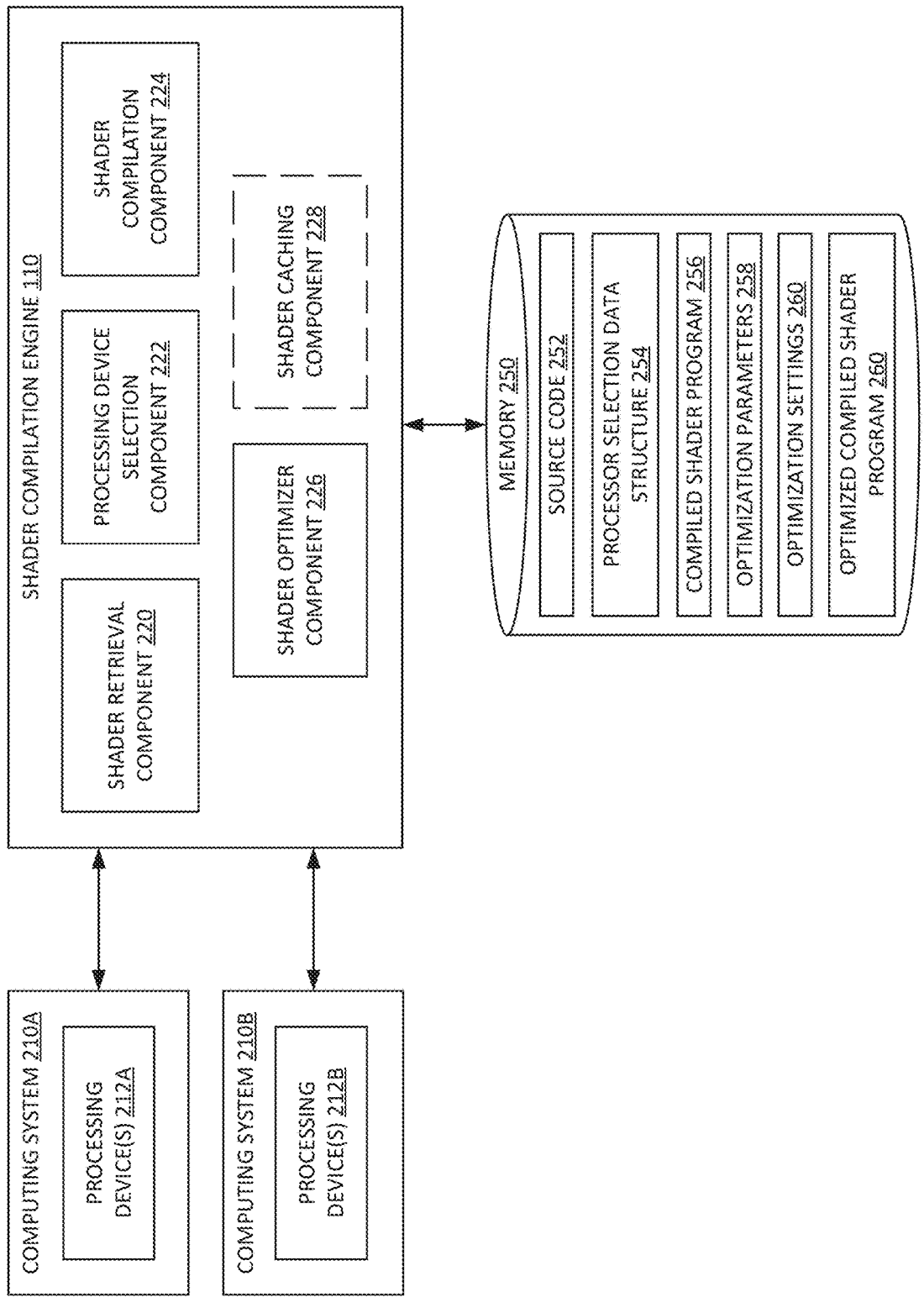
FIG. 2 is a block diagram of a shader compilation engine, according to at least one embodiment.

FIG. 2 is a block diagram of a shader compilation engine 110, according to at least one embodiment. Shader compilation engine 110 may be supported by client device 108 and/or server machine 106, as described with respect to FIGS. 1A and 1B, in some embodiments. In additional or alternative embodiments, shader compilation engine 110 may be supported by nodes 152 of system 150, as described with respect to FIG. 1B. Shader compilation engine 110 may be connected (or may run on) one or more computing systems. For example, shader compilation engine 110 may be connected to a first computing system 210A that includes a first set of processing devices 212A. Shader compilation engine 110 may also be connected to a second computing system 210B that includes a second set of processing devices 212B. The first computing system 210A may correspond to a client device 108, in some embodiments. For example, the first computing system 210A can correspond to a client device 108 that is configured to run an application 130 (or an instance 160 of application 130) provided by application hosting platform 102, as described above. In another example, the first computing system 210A can correspond to a server machine (e.g., server machine 106) that is configured to stream graphical output generated using application 130 (or the instance 160 of application 130) to a client device 108. The first set of processing devices 212A can include one or more CPUs, GPUs, etc.

In some embodiments, the second computing system 210B can include processing device(s) 212B that are separate from the processing device(s) 212A first computing system 210A. For example, as indicated above, computing system 210A (and therefore processing device(s) 212A) may reside at a client device 108. Computing system 210B (and therefore processing device(s) 212B) may reside at one or more computing devices (e.g., server machine 106, another server machine or computing device that is connected to platform 102 via network 120, etc.) that are remote from client device 108. In such example, computing system 210B may be connected to computing system 210A via a network (e.g., network 120, etc.). In another example, computing system 210B may reside at client device 108 with computing system 210A, however, processing device(s) 212B may include different processing devices than processing devices 212A. In such example, computing system 210B may be connected to computing system 210B via a bus. The second set of processing devices 212B can include one or more CPUs, GPUs, DPUs, etc.

As illustrated in FIG. 2, shader compilation engine 110 may be connected to a memory 250. In some embodiments, memory 250 may correspond to a data store, such as data store 112. In other or similar embodiments, memory 250 may correspond to memory (e.g., storage memory, random access memory, etc.) of a client device 108.

Shader compilation engine 110 may include a shader retrieval component 220, a processing device selection component 222, a shader compilation component 223, a shader optimizer component 226 and/or a shader caching component 228. As described with respect to FIGS. 1A and 1B, shader compilation engine 110 may reside on one or more client devices 108, on a server machine connected to platform 102 (e.g., server machine 106), and/or on another server machine associated with platform 102. In some embodiments, each component of shader compilation engine 110 may reside on a single computing system. For example, each component of shader compilation engine 110 may reside on client device(s) 108, server machine 106, and/or a server machine associated with platform 102. In other or similar embodiments, one or more components of shader compilation engine 110 may reside on one computing system and one or more additional components may reside on an additional computing system. For example, in some embodiments, shader retrieval component 220 may reside on client device(s) 108, and accordingly may run on processing device(s) 212A. Other components of shader compilation engine 110 may reside on server machine 106 and may run on processing device(s) 212B, or another set of processing devices of system 100 and/or system 150. It should be noted that system 100 and/or system 150 may include additional components that perform the same or similar functions as those performed by components of shader compilation engine 110. For example, a server associated with platform 102 may include one or more software components that perform the same or similar functions as those performed by shader compilation engine 110 (e.g., which may reside at client device(s) 108 and/or server machine 106).

Figure 3A:
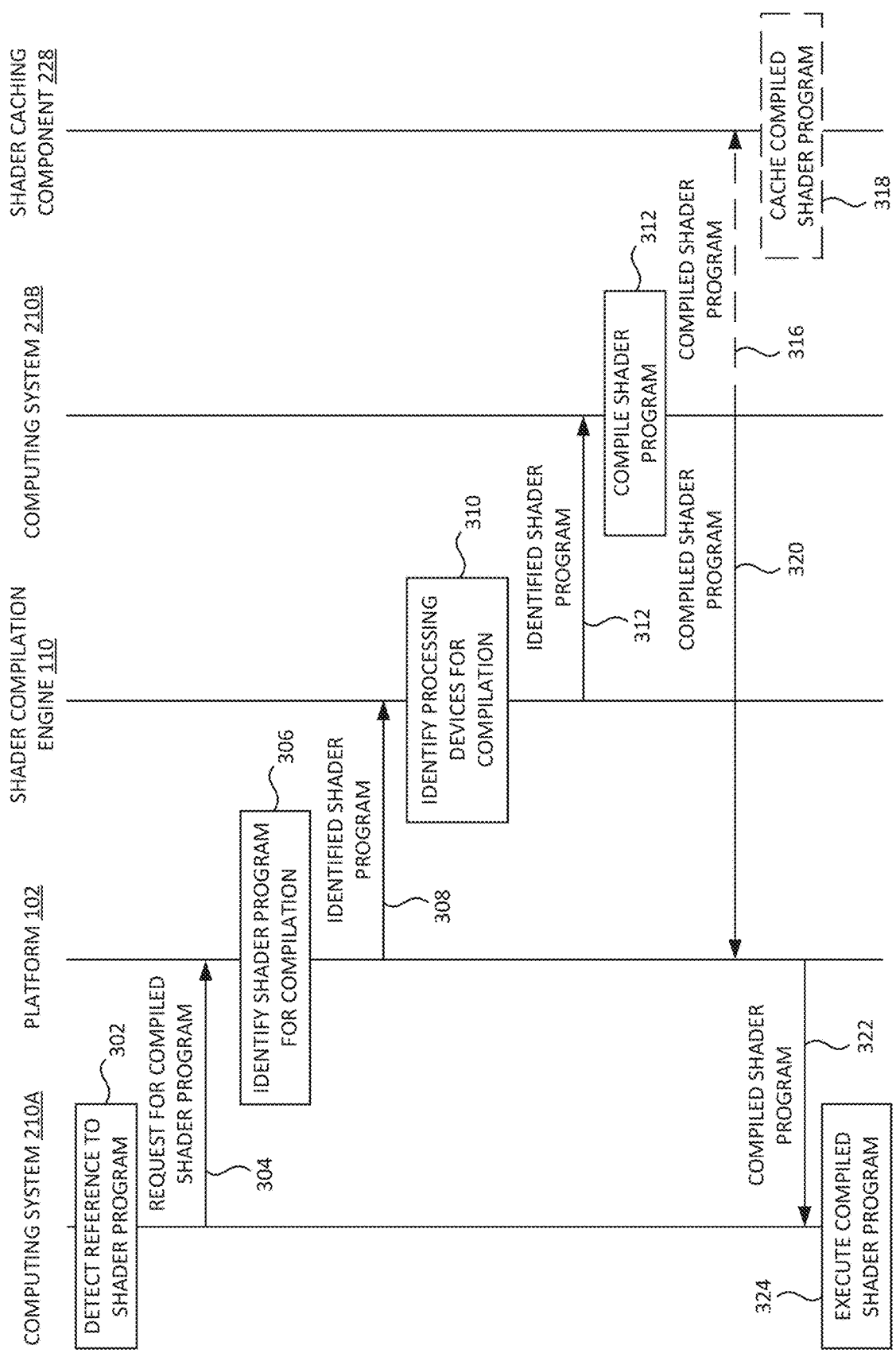
FIG. 3A illustrates an example diagram for offloading shader program compilation at a computing system, according to at least one embodiment.
Figure 3B:
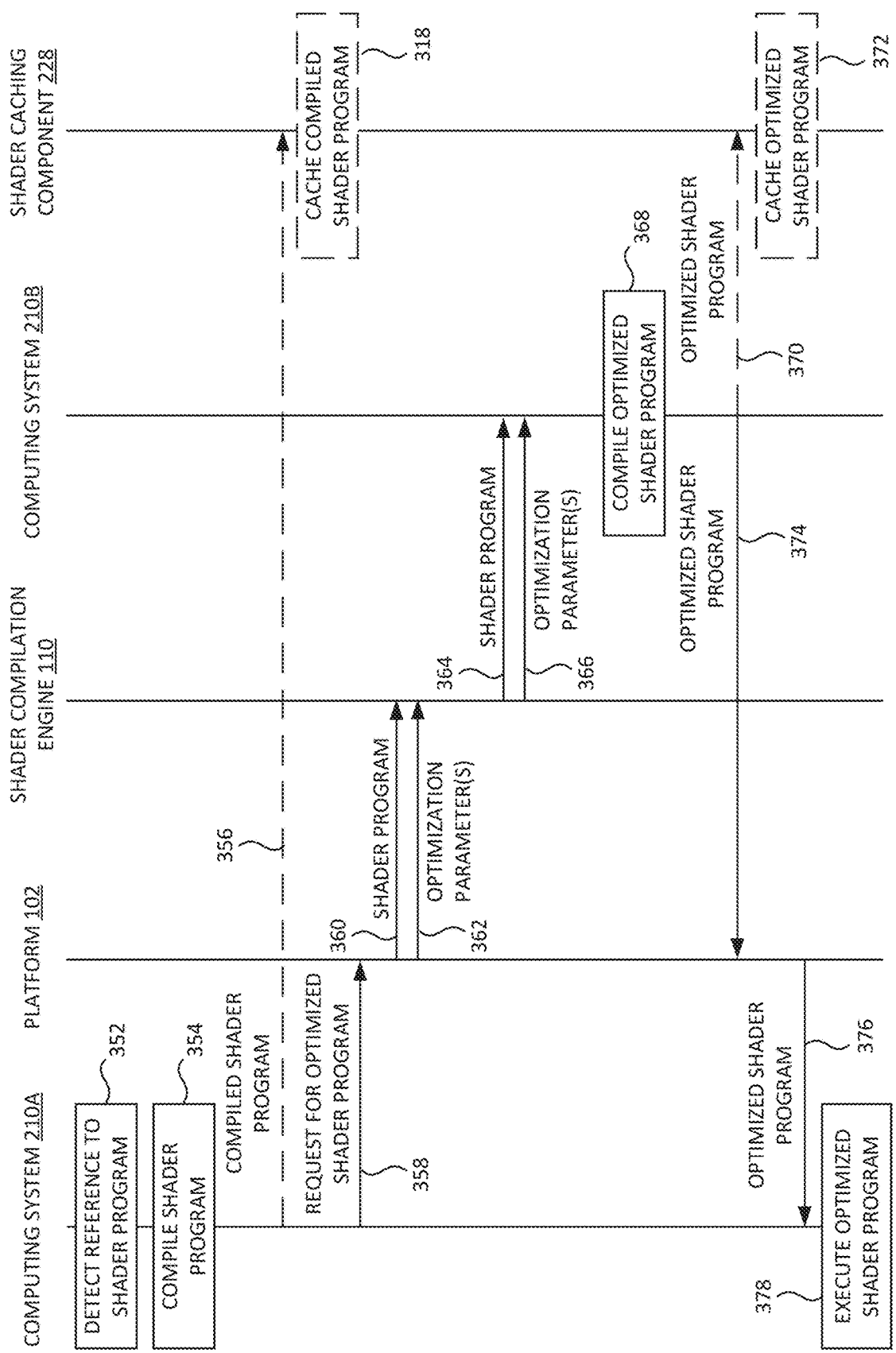
FIG. 3B illustrates an example diagram for offloading shader program compilation at a computing system, according to at least one embodiment.

FIGS. 3A and 3B illustrate example diagrams for offloading shader program compilation at a computing system, as provided by one or more components of shader compilation engine 110. It should be noted that although FIGS. 3A and 3B depict one or more operations associated with off-system shader program compilation being performed by computing system 210A, platform 102, shader compilation engine 110, computing system 210B, and shader caching component 228, additional and/or fewer entities may be involved for off-shader program compilation, in accordance with embodiments of the present disclosure. It should also be noted that although FIGS. 3A and 3B depict shader compilation engine 110 as a single entity that is in communication with computing system 210A, platform 102, computing system 210B, and/or shader caching component 228, one or more components of shader compilation engine 110 can reside or otherwise be running via processing devices 212A, platform 102 and/or processing devices 212B. In addition, shader caching component 228 can be a separate component from shader compilation engine 110 or can be included as a component of shader compilation engine 110, as illustrated in FIG. 2.

As described above, processing device(s) 212A (e.g., of computing system 210A) may execute instructions associated with running application 130 (or instance 160 of application 130) via client device 108. It should be noted that although some embodiments or examples are directed to application 130 running via processing device(s) 212A, embodiments of the present disclosure are applicable if instance 160 of application 130 is running via processing device(s) 212A. In some embodiments, one or more components associated with computing system 210A (e.g., shader compilation engine 110, another software component, etc.) may detect a reference to a shader program by application 130 (i.e., as indicated by block 302 of FIG. 3A). In some embodiments, the one or more components may detect the reference for the shader programs as the application 130 is running via processing device(s) 212A. In other or similar embodiments, the one or more components may detect that the shader programs are to be referenced (or are likely to be referenced) by application 130 before such shader programs are actually referenced and/or before the application 130 is initialized via processing device(s) 212A.

Responsive to detecting that the shader programs are referenced, or are to be referenced, by application 130, the one or more components of computing system 210A may transmit a request to platform 102 for the compiled version of the shader programs (i.e., indicated by notification 304). In some embodiments, the one or more components of computing system 210A (e.g., shader retrieval component 220, another component of computing system 210A) may determine a processing state associated with processing device(s) 212A. The processing state can correspond to a processing capacity, a processing latency, a processing throughput, a number of shader programs of the set of shader programs, etc. The processing state may be determined in view of one or more characteristics of the shader programs to be compiled (e.g., a size of the shader programs, a type of the shader programs, a complexity of the shader programs) and the current state (e.g., a pipeline state, a hardware state, a driver state, etc.) of computing system 210A. In some embodiments, the shader program characteristics may be provided by a developer associated with the application. The characteristics can be included in a file or a data structure (e.g., a table) with application from application development platform 104. In some embodiments, the file or data structure that includes the characteristics can be stored in memory 250. In some embodiments, data indicating the current state of the computing system 210A can be stored in memory 250. A state agent (e.g., or other software component) may periodically evaluate the current state of computing system 210A and update memory 250 to include an indication of the evaluated current state, in some embodiments. In other or similar embodiments, the state agent may evaluate the current state of computing system 210A in response to a request, e.g., by another component of computing system 210A to determine the processing state of processing device(s) 212A.

The one or more components may determine whether the determined processing state satisfies a processing state criterion associated with application 130. The processing state criterion may correspond to an optimal and/or target operating condition (e.g., an efficiency condition, a latency condition, a rendering quality condition, etc.) associated with the application 130. The one or more components may determine whether the determined capacity satisfies the processing state criterion by determining whether processing device(s) 212A are able to compile the shader programs in accordance with the optimal and/or target operating conditions, in view of the current state of computing system 210A. For example, the one or more components may determine whether a sufficient amount of resources of processing devices 212A are available to compile the shader programs in accordance with the optimal and/or target operating conditions within a particular amount of time. The one or more components may determine whether the processing device(s) 212A are able to compile the shader programs according to other techniques, in other or similar examples. If the one or more components determine that the processing state satisfies the processing state criterion, processing device(s) 212A may compile the shader programs. If the one or more components determine that the processing state does not satisfy the processing state criterion, the one or more components may provide the request 304 for the compiled shader programs, as described above.

In some embodiments, one or more components of platform 102 (e.g., shader retrieval component 220 of shader compilation engine 110) may identify the shader programs for compilation (i.e., as indicated by block 306). For example, shader retrieval component 220 may identify a region of memory 250 that stores the source code 252 for the shader programs. Shader retrieval component 220 may retrieve the source code 252 from the identified region and, in some embodiments, may provide the source code 252 for the shader program to one or more components of shader compilation engine 110 (as indicated by notification 308).

In some embodiments, shader retrieval component 220 may determine whether the shader program has already been compiled (e.g., for another instance 160 of application 130 running via another client device 108 of system 100 and/or system 150). For example, responsive to receiving a request for a shader program, shader retrieval component 220 may determine whether the compiled version of the shader program is stored in the aggregated shader cache 114. The compiled version of the shader program may have been compiled by processing device(s) that are executing another instance 160 of the application 130 and/or other processing device(s) of system 100 and/or system 150. Responsive to determining that the compiled version of the shader program is stored in the aggregated shader cache 114, shader retrieval component 220 may retrieve the compiled shader program from the aggregated shader cache 114 and provide the compiled shader program to processing device(s) 212A, in accordance with embodiments described herein. As described with respect to FIG. 1B, shader compilation engine 110 and/or a portion of aggregated shader cache 114 can reside on one or more nodes of system 150. In an illustrative example, shader retrieval component 220 of shader compilation engine 110 residing on node 152A may determine whether the compiled version of a shader program is stored in aggregated shader cache 114A, as described above. In response to determining that the compiled version of the shader program is not stored in aggregated shader cache 114A, shader retrieval component 220 may transmit an inquiry to shader compilation engines 110 of other nodes 152 of system 150 (e.g., node 152B, node 152C, etc.) of whether aggregated shader caches 114B and/or 114C store a compiled version of the shader program. The shader compilation engines 110 of such nodes 152 may transmit a response including the compiled version of the shader program (i.e., if the compiled shader program is stored in shader caches 114B and/or 114C). Shader retrieval component 220 may update aggregated shader cache 114A to include the received compiled shader program and may transmit the compiled shader program to processing device(s) 212A, as described above.

Processing device selection component 222 of shader compilation engine 110 may identify one or more processing devices to compile the source code 252 for the shader program (i.e., as indicated by block 310). In some embodiments, memory 250 (or another memory of systems 100 and/or 150) may include a processor selection data structure 254. The processor selection data structure 254 can indicate one or more sets of processing devices associated with system 100 and/or 150 and can indicate a hierarchy or an ordering at which each set of processing devices is to be selected for compiling shader programs. In one illustrative example, the processor selection data structure 254 can indicate processing device(s) 212A and processing device(s) 212B. The data structure 254 can indicate that processing device(s) 212B are to be selected to compile shader programs (e.g., if processing device(s) 212B are available at or around the time of the compilation). The data structure 254 can also indicate that, if processing device(s) 212B are not available at or around the time of the compilation (e.g., the processing device(s) 212B are used to execute instructions for other processes, etc.), processing device(s) 212A, or another set of processing devices, are to be used. Processing device selection component 222 can identify the processing device(s) to be used to compile the shader programs based on the processing selection data structure 254. In some embodiments, responsive to determining, based on data structure 254, that processing device(s) 212B are to be used, processing device selection component 222 may transmit a request to computing system 210B inquiring whether processing device(S) 212B are available to compile the shader programs. Processing device selection component 222 may select the processing devices 212B for the compilation in response to receiving a notification that the processing devices 212B are available. In additional or alternative embodiments, processing device selection component 222 may determine an availability of processing device(s) 212B to compile the shader programs according to other techniques (e.g., based on another data structure that indicates available processing device(s) of system 100 and/or system 150 and/or using an agent on computing system 210B that monitors availability of processing device(s) 212B and provides this information to processing device selection component 222 upon request or periodically).

It should be noted that processing device selection component 222 may select processing device(s) to be used for compiling the shader programs according to other techniques. For example, processing device selection component 222 may transmit an inquiry to computing systems associated with one or more sets of processing devices of system 100 and/or system 150 inquiring whether a respective set of processing devices is available to compile the shader programs. The inquiry may additionally or alternatively include a request for an amount and/or type of available processing resources at each computing system. Processing device selection component 222 may select a particular set of processing device based on received responses to the inquiries. For example, processing device selection component 222 may select a set of processing devices based on the computing system that responds the quickest to the inquiry. In another example, processing device selection component 222 may determine a processing state associated with each set of processing devices and may determine whether any of the determined processing states satisfy the processing state criterion. In response to determining that a processing state for a respective set of processing devices satisfies the processing state criterion, processing device selection component 222 may select the respective set of processing devices for compiling the shader program. In other or similar embodiments, a user associated with application hosting platform 102 and/or application developer platform 104 (e.g., a developer, a technician, an operator, etc.) may provide shader compilation engine 110 (e.g., via a client device connected to shader compilation engine 110) with an indication of a particular set of processing devices that are to be used to compile shader programs for the application. Shader compilation engine 110 may store the provided indication at memory 250 (not shown), and processing device selection component 222 may select the processing devices for the compilation based on the stored indication.

Processing device selection component 222 may select processing device(s) 212B for compiling the shader programs, as described above. Responsive to processing device selection component 222 selecting processing device(s) 212B, shader compilation component 224 may cause compilation of the shader programs via processing device(s) 212B. For example, shader compilation component 224 may transmit the shader program (or the source code 252 for the shader program) to processing device(s) 212B (i.e., indicated by notification 312 of FIG. 3A). In some embodiments, shader compilation component 224 may transmit the shader program to computing system 210B via a network (e.g., network 120) or a bus (e.g., a bus of client device 108). In some embodiments, shader compilation component 224 may provide state data associated with computing system 210A with the shader programs to computing system 210B. State data can include a pipeline state of computing system 210A, a hardware state of computing system 210A, a driver state of computing system 210A, and so forth. In some embodiments, shader compilation component 224 can obtain the state data via a transmission from computing system 210A. In other or similar embodiments, shader compilation component 224 can obtain the state data by accessing one or more portions of memory of computing system 210A (e.g., registers, etc.). Processing device(s) 212B (e.g., of computing system 210B) may compile the shader programs in view of the state data (i.e., so that the compiled versions of the shader programs are compatible to run on processing device(s) 212A in view of the state data).

Computing system 210B may transmit the compiled version of the shader program to platform 102 (i.e., as indicated by notification 320). The compiled version of the shader program may be stored at memory 250 as compiled shader program 256, as illustrated in FIG. 2. In some embodiments, computing system 210B may transmit the compiled shader program 256 to shader caching component 228 (i.e., as indicated by notification 316). Shader caching component 228 may cache the compiled shader program 256 in aggregated shader cache 114 (i.e., as indicated by block 318), as described above. In some embodiments, shader caching component 228 may validate compiled shader program 256 before caching the compiled shader program 256 in the aggregated shader cache 114, as described above.

Platform 102 may provide the compiled shader program 256 to processing device(s) 212A (i.e., as indicated by notification 322), in some embodiments. In additional or alternative embodiments, computing system 210B may transmit the compiled version of the shader program directly to computing system 210A. Responsive to receiving the compiled shader program 256, processing device(s) 212A can execute the compiled shader program 256 (e.g., to render graphics associated with the application 130, etc.), as indicated by block 324. As described above, in some embodiments, shader compilation engine 110 may facilitate compilation of the shader program for application 130 before such shader program is referenced by application 130. In such embodiments, platform 102 (and/or shader compilation engine 110) may store the compiled shader program 256 in a memory that is accessible by computing system 210A. Computing system 210A may provide the compiled shader program 256 for execution via processing device(s) 212A in response to detecting that application 130 has referenced the shader program.

FIG. 3B illustrates another example diagram for off-system shader program compilation, according to aspects of the present disclosure. As illustrated in FIG. 3B, one or more components running on processing device(s) 212A (e.g., shader retrieval component 220 of shader compilation engine 110, other components associated with executing application 130 via processing device(s) 212A, etc.) may detect a reference to a shader program by application 130 (i.e., as indicated by block 352). In some embodiments, the one or more components may detect that the shader program is to be referenced (e.g., before the application 130 is initialized, during a runtime of the application, etc.), as described above. In some embodiments, processing device(s) 212A may compile the referenced (or to be referenced) shader program (i.e., as indicated by block 354), to generated compiled shader program 256. In some embodiments, compiled shader program 256 may only satisfy minimum operating and/or performance characteristics associated with running application 130. For example, the shader programs compiled shader program 256 may only be sufficient to render a graphic of application 130, but may not satisfy optimal and/or even target rendering conditions (e.g., efficiency conditions, latency conditions, rendering quality conditions, etc.) for the application. Compiled shader program(s) 256, accordingly, may not be optimized for efficient utilization of computing system resources during execution. Compiled shader program 256 may be stored in memory 250, as illustrated in FIG. 2.

In some embodiments, one or more components of processing device(s) 212A may, optionally, transmit compiled shader program 256 to shader caching component 228 (i.e., indicated by notification 356). Shader caching component 228 may cache compiled shader program 256 at aggregated shader cache 114, as described above. In some embodiments, shader caching component 228 may include, with compiled shader program 256, an indication that processing devices 212A compiled the shader program and/or that compiled shader program 256 only meet minimum operating and/or performance conditions.

The one or more components of computing system 210A may transmit a request for an optimized version of the shader program to platform 102 (i.e., as indicated by notification 358). In some embodiments, one or more components of computing system 210A (e.g., shader retrieval component 220) may determine whether an optimized version of the shader program is included in aggregated shader cache 114, in accordance with previously described embodiments. In response to determining that the optimized version of the shader program is not included in aggregated shader cache 114, the one or more components of computing system 210A can transmit the request 358 to platform 102, in accordance with previously described embodiments. In some embodiments, one or more components of platform 102 (e.g., shader retrieval component 220 of shader compilation engine 110) may identify the shader programs for compilation, as described above. In other or similar embodiments, computing system 210A may obtain the source code 252 associated with the shader programs before the shader programs are compiled via processing device(s) 212A. Computing system 210A may transmit the source code 252 to platform 102 with request 358, in some embodiments.

In some embodiments, one or more components of platform 102 (e.g., shader retrieval component 220, or another component of platform 102) may identify the shader program for compilation and may obtain the source code 252 associated with the identified shader programs (i.e., if not provided with request 358). In some embodiments, the one or more components of platform 102 may provide the source code 252 for the shader programs to one or more components of shader compilation engine 110 (i.e., as indicated by notification 360). Platform 102 may also provide an indication of a set of optimization parameters 258 with the source code 252 (i.e., as indicated by notification 362). Optimization parameters 258 may correspond to target and/or optimal operating and/or performance conditions associated with running application 130 via processing device(s) 212A. For example, optimization parameters 258 may include parameters that are associated with a target and/or optimal efficiency associated with executing the compiled shader programs via processing device(s) 212A, a target and/or optimal rendering quality associated with application 130, and/or a target and/or optimal latency associated with executing the compiled shader program(s) via processing device(s) 212A. Optimization parameters 258 can include, but are not limited to, a target number of reserved registers associated with application 130, an amount of shared memory associated with application 130, a minimum compile time associated with the compiled program, a redundancy rate associated with the compiled program, and so forth. Such parameters can be defined by a user (e.g., an operator, a developer, etc.) associated with application developer platform 104 and/or application hosting platform 102. In other or similar embodiments, platforms 102 and/or 104 may determine the optimal parameters based on historical and/or experimental data associated with executing compiled shader programs via various types of processing device(s). In some embodiments, platform 102 may obtain optimization parameters 258 from data store 112. In other or similar embodiments, computing system 210A may receive optimization parameters 258 from computing system 210A.

Processing device selection component 222 may identify the second set of processing devices 212B for compiling the optimized shader program, in accordance with previously described embodiments. In some embodiments, shader compilation engine 110 may transmit the source code 252 for the shader program to computing system 210B (which includes processing device(s) 212B) with optimization parameters 258 associated with the shader program (i.e., as indicated by notifications 364 and 366). Processing device(s) 212B, residing at computing system 210B, may generate a compiled version of the shader program to generate an optimized compiled shader program 260. The optimized compiled shader program 260 may satisfy target and/or optimal conditions associated with application 130 when executed via processing device(s) 212A.

In some embodiments, processing device(s) 212B may generate the optimized compiled shader program 260 by generating multiple compiled shader program according to different compilation settings. In some embodiments, the compilation settings may correspond to the state of computing system 210A. For example, the compilation settings may correspond to a pipeline state, hardware state, driver state, etc. of computing system 210A. In another example, the compilation settings can correspond to a particular register file associated with a compiled shader program, a code size vs. execution speed associated with the compiled shader program, loop unrolling heuristics, and so forth. Computing system 210B may cause multiple versions of the compiled shader program to be generated via processing device(s) 212B according to the different compilation settings. Computing system 210B may select the version of the compiled shader program that satisfies (or most closely satisfies) the target and/or optimal operating and/or performance conditions as the optimized compiled shader program 260. In one example, computing system 210B may run one or more experiments or tests on each version of the compiled shader program to determine which version satisfies (or most closely satisfies) the target and/or optimal conditions. For instance, computing system 210B may run a rendering test for each version of the compiled shader program to determine which version of the shader program is associated with the highest rendering quality. The version associated with the highest rendering quality may be selected as the optimized compiled shader program 260. Other types of tests may be used to determine which shader program is the optimized compiled shader program 260, in some embodiments. In some embodiments, the experiments or tests may be facilitated by shader optimized component 226 of shader compilation engine 110.

In some embodiments, responsive to identifying the optimized compiled shader program 260, computing system 210B may identify the compilation settings that were used to compile the optimized compiled shader program and may store such settings as optimization settings 260 (e.g., at memory 250). Computing system 210B may use optimization settings 260 for future shader program compilations, in accordance with previously described embodiments.

Computing system 210B may transmit optimized compiled shader program 260 to platform 102 (i.e., as indicated by notification 374). In some embodiments, computing system 210B may transmit optimized compiled shader program 260 to shader caching component 228 (i.e., as indicated by notification 370). Shader caching component 228 may cache optimized compiled shader program 260 in aggregated shader cache 114 (i.e., as indicated by block 372), as described above. In some embodiments, shader caching component 228 may replace compiled shader program 256 stored in aggregated shader cache 114 with optimized compiled shader program 260. For example, shader caching component 228 may remove compiled shader program 256 from aggregated shader cache 114 and store optimized compiled shader program 260 in aggregated shader cache 114. Shader caching component 228 may update any records associated with compiled shader program 256 (e.g., pointers, data structure entries, etc.) to correspond to optimized compiled shader program 260.

Platform 102 may provide the optimized compiled shader program 276 computing system 210A (i.e., as indicated by notification 376), in some embodiments. In additional or alternative embodiments, computing system 210B may transmit optimized compiled shader program 260 directly to computing system 210A. Responsive to receiving the compiled shader program 256, processing device(s) 212A can execute the optimized compiled shader program 260 (i.e., as indicated by block 378). In some embodiments, one or more components of computing system 210A may replace compiled shader program 256 in memory associated with computing system 210A with optimized compiled shader program 260. For example, one or more components of computing system 210A may remove compiled shader program 256 from memory associated with computing system 210A and store optimized compiled shader program 260 in the memory.

Figure 4:
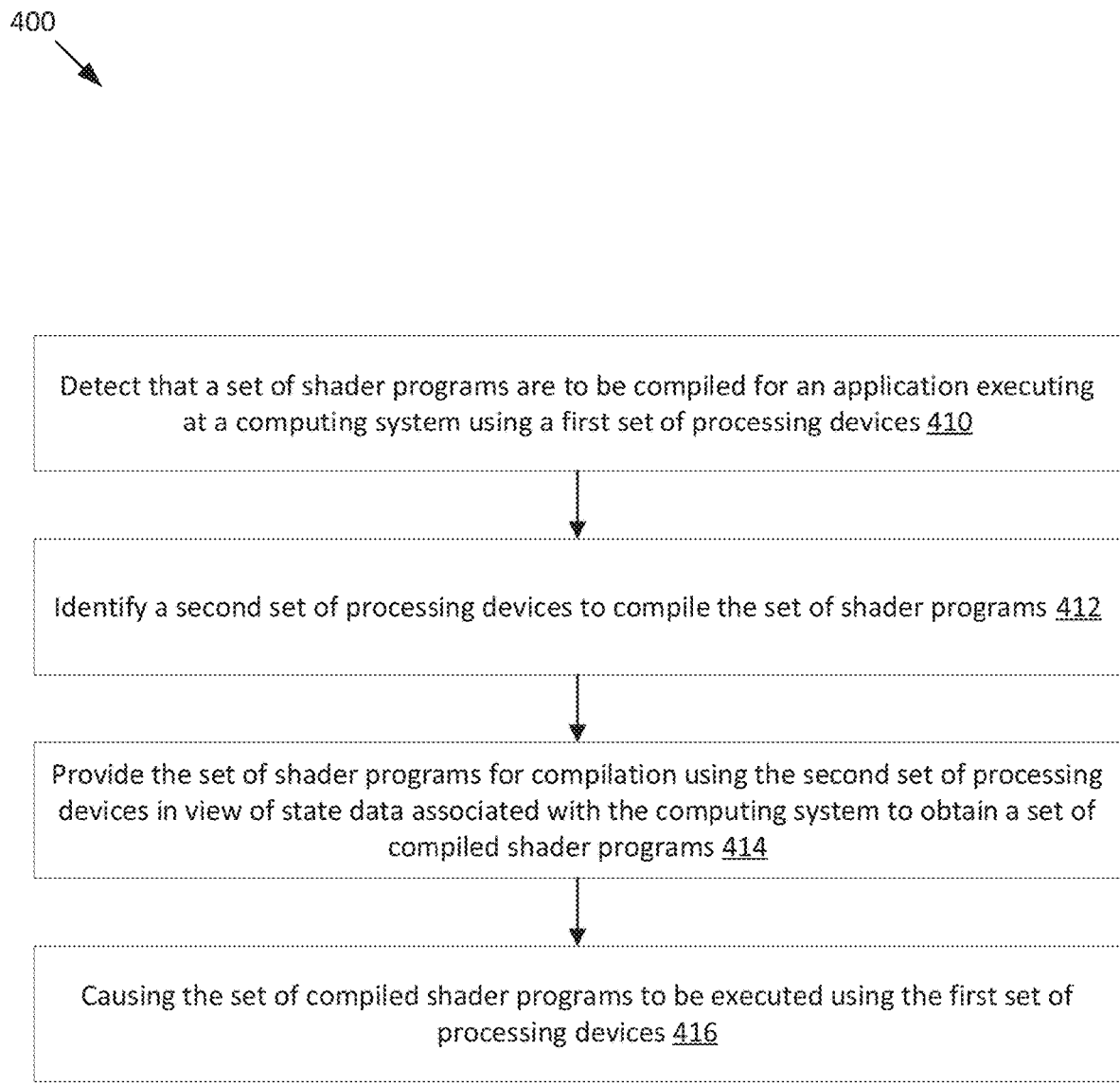
FIG. 4 illustrates a flow diagram of an example method of offloading shader program compilation at a computing system, according to at least one embodiment.
Figure 5:
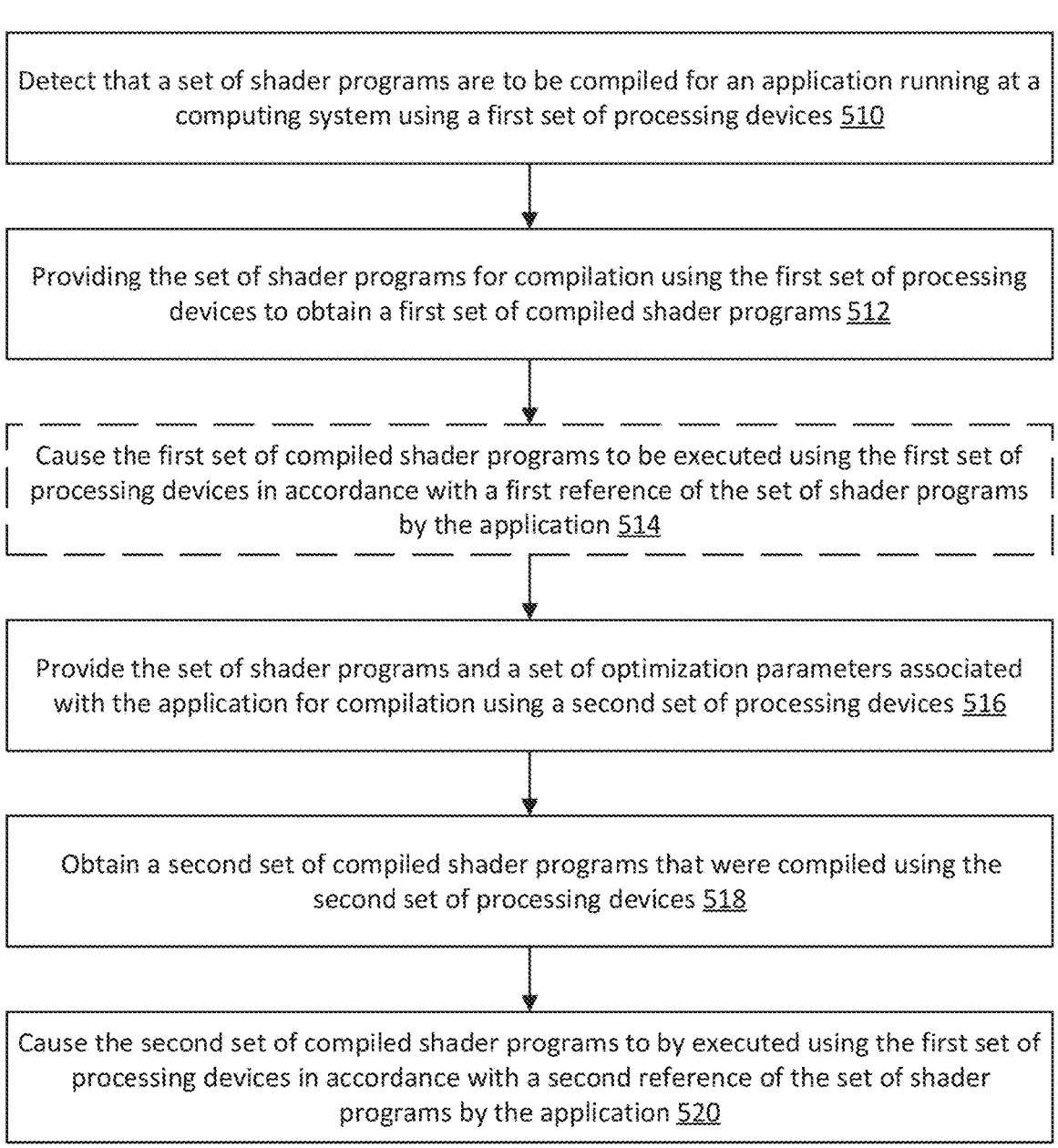
FIG. 5 illustrates a flow diagram of an example method of offloading shader program compilation at a computing system, according to at least one embodiment.

FIGS. 4 and 5 are flow diagrams of example methods 400 and 500, respectively, that are related to offloading shader program compilation at a computing system, according to at least some embodiments. In at least one embodiment, methods 400 and/or 500 may be performed by server machine 106, server machine 116, client device 108, or some other computing device, or a combination of multiple computing devices. Methods 400 and/or 500 may be performed by one or more processing units (e.g., CPUs and/or GPUs), which may include (or communicate with) one or more memory devices. In at least one embodiment, methods 400 and/or 500 may be performed by multiple processing threads (e.g., CPU threads and/or GPU threads), each thread executing one or more individual functions, routines, subroutines, or operations of the method. In at least one embodiment, processing threads implementing methods 400 and/or 500 may be synchronized (e.g., using semaphores, critical sections, and/or other thread synchronization mechanisms). Alternatively, processing threads implementing methods 400 and/or 500 may be executed asynchronously with respect to each other. Various operations of methods 400 and/or 500 may be performed in a different order compared with the order shown in FIGS. 4 and/or 5. Some operations of the methods may be performed concurrently with other operations. In at least one embodiment, one or more operations shown in FIGS. 4 and/or 5 may not always be performed.

FIG. 4 illustrates a flow diagram of an example method 400 of offloading shader program compilation at a computing system, according to at least one embodiment. In some embodiments, one or more operations of method 400 may be performed by one or more components or modules of shader compilation engine 110, described herein. Processing units performing method 400 may detect, at block 410, that a set of shader programs are to be compiled for an application executing at a computing system using a first set of processing devices. The set of processing devices can include at least a first processing unit (e.g., a CPU, a GPU, etc.). In some embodiments, processing units performing method 400 can determine that the set of shader programs are to be compiled responsive to detecting that the set of shader programs are referenced by the application. In other or similar embodiments, processing units performing method 400 can determine that the set of shader programs are to be compiled before the set of shader programs are referenced (e.g., during an initialization of the application).

At block 412, processing units performing method 400 may identify a second set of processing devices to compile the set of shader programs. In some embodiments, processing units performing method 400 may determine a first processing capacity associated with the first set of processing devices in view of one or more characteristics associated with the set of shader programs. Processing units performing method 400 may determine whether the first processing capacity satisfies a processing capacity criterion associated with the application, as described above. In some embodiments, processing units performing method 400 may identify the second set of processing devices to compile the set of shader programs responsive to determining that the determined first processing capacity does not satisfy the processing capacity criterion (e.g., the first set of processing devices does not have sufficient capacity to compile the shader programs). In some embodiments, processing units performing method 400 may identify a second set of processing devices, in accordance with embodiments described herein. The second set of processing devices can include at least a second processing unit (e.g., a CPU, a GPU, etc.) of the computing system that is separate from the first processing unit of the first set of processing devices or a third processing unit (e.g., a CPU, a GPU, a DPU, etc.) that is remote from the computing system. In some embodiments, the third processing unit can include a DPU of a data center.

At block 414, processing units performing method 400 may provide the set of shader programs for compilation using the second set of processing devices in view of state data associated with the computing system to obtain a set of compiled shader programs. In some embodiments, processing units performing method 400 may determine a second processing capacity associated with the second set of processing devices in view of the one or more characteristics associated with the set of shader programs. Processing units performing method 400 may determine whether the second processing capacity satisfies the processing capacity criterion. Processing units performing method 400 may provide the set of shader programs for compilation via the second set of processing devices responsive to determining that the second processing capacity satisfies the processing capacity criterion. The state data can include at least one of a pipeline state of the computing system, a hardware state of the computing system, or a driver state of the computing system.

At block 416, processing units performing method 400 may cause the set of compiled shader programs to be executed using the first set of processing devices.

FIG. 5 illustrates a flow diagram of an example method 500 of offloading shader program compilation at a computing system, according to at least one embodiment. In some embodiments, one or more operations of method 800 may be performed by one or more components or modules of shader compilation engine 110, described herein. Processing units performing method 500 may detect, at block 510, that a set of shader programs are to be compiled for an application running at a computing system using a first set of processing devices, as described above. At block 512, processing units performing method 500 may provide the set of shader programs for compilation using the first set of processing devices to obtain a first set of compiled shader programs. The first set of compiled shader programs may meet at least one of a minimum operating condition or a minimum performance condition associated with the application. At block 514, processing units performing method 500 may, optionally, cause the first set of compiled shader programs to be executed using the first set of processing devices in accordance with a first reference of the set of shader programs by the application.

At block 516, processing units performing method 500 may provide the set of shader programs and a set of optimization parameters associated with the application for compilation using a second set of processing devices. The optimization parameters may be provided with the set of shader programs for compilation using the second set of processing devices. The optimization parameters may correspond to at least one of a target rendering quality condition, a target efficiency condition, and/or a target latency condition. At block 518, processing units performing method 500 may obtain a second set of compiled shader programs that were compiled using the second set of processing devices. The second set of compiled shader programs may meet at least one of a target operating condition or a target performance condition associated with the application.

At block 520, processing units performing method 500 may cause the second set of compiled shader programs to be executed using the first set of processing devices in accordance with a second reference of the set of shader programs by the application.

Inference and Training Logic

Figure 6A:
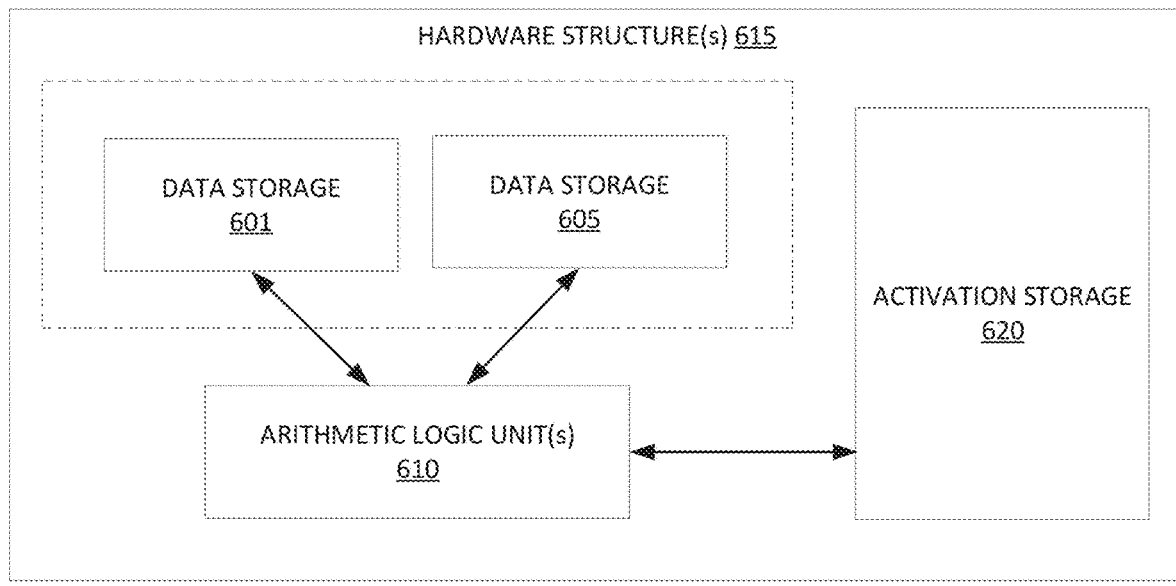
FIG. 6A illustrates inference and/or training logic, according to at least one embodiment.

FIG. 6A illustrates inference and/or training logic 615 used to perform inferencing and/or training operations associated with one or more embodiments. Details regarding inference and/or training logic 615 are provided below in conjunction with FIGS. 6A and/or 6B.

In at least one embodiment, inference and/or training logic 615 may include, without limitation, code and/or data storage 601 to store forward and/or output weight and/or input/output data, and/or other parameters to configure neurons or layers of a neural network trained and/or used for inferencing in aspects of one or more embodiments. In at least one embodiment, training logic 615 may include, or be coupled to code and/or data storage 601 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which the code corresponds. In at least one embodiment, code and/or data storage 601 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 601 may be included with other on-chip or off-chip data storage, including a processor's L1, L2, or L3 cache or system memory.

In at least one embodiment, any portion of code and/or data storage 601 may be internal or external to one or more processors or other hardware logic devices or circuits. In at least one embodiment, code and/or code and/or data storage 601 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 601 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 615 may include, without limitation, a code and/or data storage 605 to store backward and/or output weight and/or input/output data corresponding to neurons or layers of a neural network trained and/or used for inferencing in aspects of one or more embodiments. In at least one embodiment, code and/or data storage 605 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 615 may include, or be coupled to code and/or data storage 605 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 605 may be included with other on-chip or off-chip data storage, including a processor's L1, L2, or L3 cache or system memory. In at least one embodiment, any portion of code and/or data storage 605 may be internal or external to on one or more processors or other hardware logic devices or circuits. In at least one embodiment, code and/or data storage 605 may be cache memory, DRAM, SRAM, non-volatile memory (e.g., Flash memory), or other storage. In at least one embodiment, choice of whether code and/or data storage 605 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 601 and code and/or data storage 605 may be separate storage structures. In at least one embodiment, code and/or data storage 601 and code and/or data storage 605 may be same storage structure. In at least one embodiment, code and/or data storage 601 and code and/or data storage 605 may be partially same storage structure and partially separate storage structures. In at least one embodiment, any portion of code and/or data storage 601 and code and/or data storage 605 may be included with other on-chip or off-chip data storage, including a processor's L1, L2, or L3 cache or system memory.

In at least one embodiment, inference and/or training logic 615 may include, without limitation, one or more arithmetic logic unit(s) ("ALU(s)") 610, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 620 that are functions of input/output and/or weight parameter data stored in code and/or data storage 601 and/or code and/or data storage 605. In at least one embodiment, activations stored in activation storage 620 are generated according to linear algebraic and or matrix-based mathematics performed by ALU(s) 610 in response to performing instructions or other code, wherein weight values stored in code and/or data storage 605 and/or code and/or data storage 601 are used as operands along with other values, such as bias values, gradient information, momentum values, or other parameters or hyperparameters, any or all of which may be stored in code and/or data storage 605 or code and/or data storage 601 or another storage on or off-chip.

In at least one embodiment, ALU(s) 610 are included within one or more processors or other hardware logic devices or circuits, whereas in another embodiment, ALU(s) 610 may be external to a processor or other hardware logic device or circuit that uses them (e.g., a co-processor). In at least one embodiment, ALUs 610 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 601, code and/or data storage 605, and activation storage 620 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 620 may be cache memory, DRAM, SRAM, non-volatile memory (e.g., Flash memory), or other storage. In at least one embodiment, activation storage 620 may be completely or partially within or external to one or more processors or other logical circuits. In at least one embodiment, choice of whether activation storage 620 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 615 illustrated in FIG. 6A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 6A may be used in conjunction with central processing unit ("CPU") hardware, graphics processing unit ("GPU") hardware or other hardware, such as data processing unit ("DPU") hardware, or field programmable gate arrays ("FPGAs").

Figure 6B:
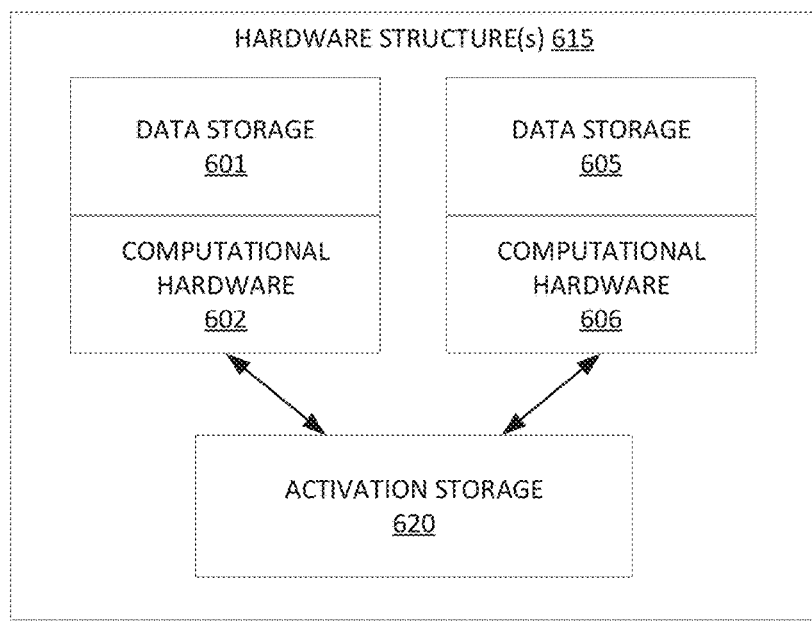
FIG. 6B illustrates inference and/or training logic, according to at least one embodiment.

FIG. 6B illustrates inference and/or training logic 615, according to at least one or more embodiments. In at least one embodiment, inference and/or training logic 615 may include, without limitation, hardware logic in which computational resources are dedicated or otherwise exclusively used in conjunction with weight values or other information corresponding to one or more layers of neurons within a neural network. In at least one embodiment, inference and/or training logic 615 illustrated in FIG. 6B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 6B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 615 includes, without limitation, code and/or data storage 601 and code and/or data storage 605, which may be used to store code (e.g., graph code), weight values and/or other information, including bias values, gradient information, momentum values, and/or other parameter or hyperparameter information. In at least one embodiment illustrated in FIG. 6B, each of code and/or data storage 601 and code and/or data storage 605 is associated with a dedicated computational resource, such as computational hardware 602 and computational hardware 606, respectively. In at least one embodiment, each of computational hardware 602 and computational hardware 606 comprises one or more ALUs that perform mathematical functions, such as linear algebraic functions, only on information stored in code and/or data storage 601 and code and/or data storage 605, respectively, result of which is stored in activation storage 620.

In at least one embodiment, each of code and/or data storage 601 and 605 and corresponding computational hardware 602 and 606, respectively, correspond to different layers of a neural network, such that resulting activation from one "storage/computational pair 601/602" of code and/or data storage 601 and computational hardware 602 is provided as an input to "storage/computational pair 605/606" of code and/or data storage 605 and computational hardware 606, in order to mirror conceptual organization of a neural network. In at least one embodiment, each of storage/computational pairs 601/602 and 605/606 may correspond to more than one neural network layer. In at least one embodiment, additional storage/computation pairs (not shown) subsequent to or in parallel with storage computation pairs 601/602 and 605/606 may be included in inference and/or training logic 615.

Data Center

Figure 7:
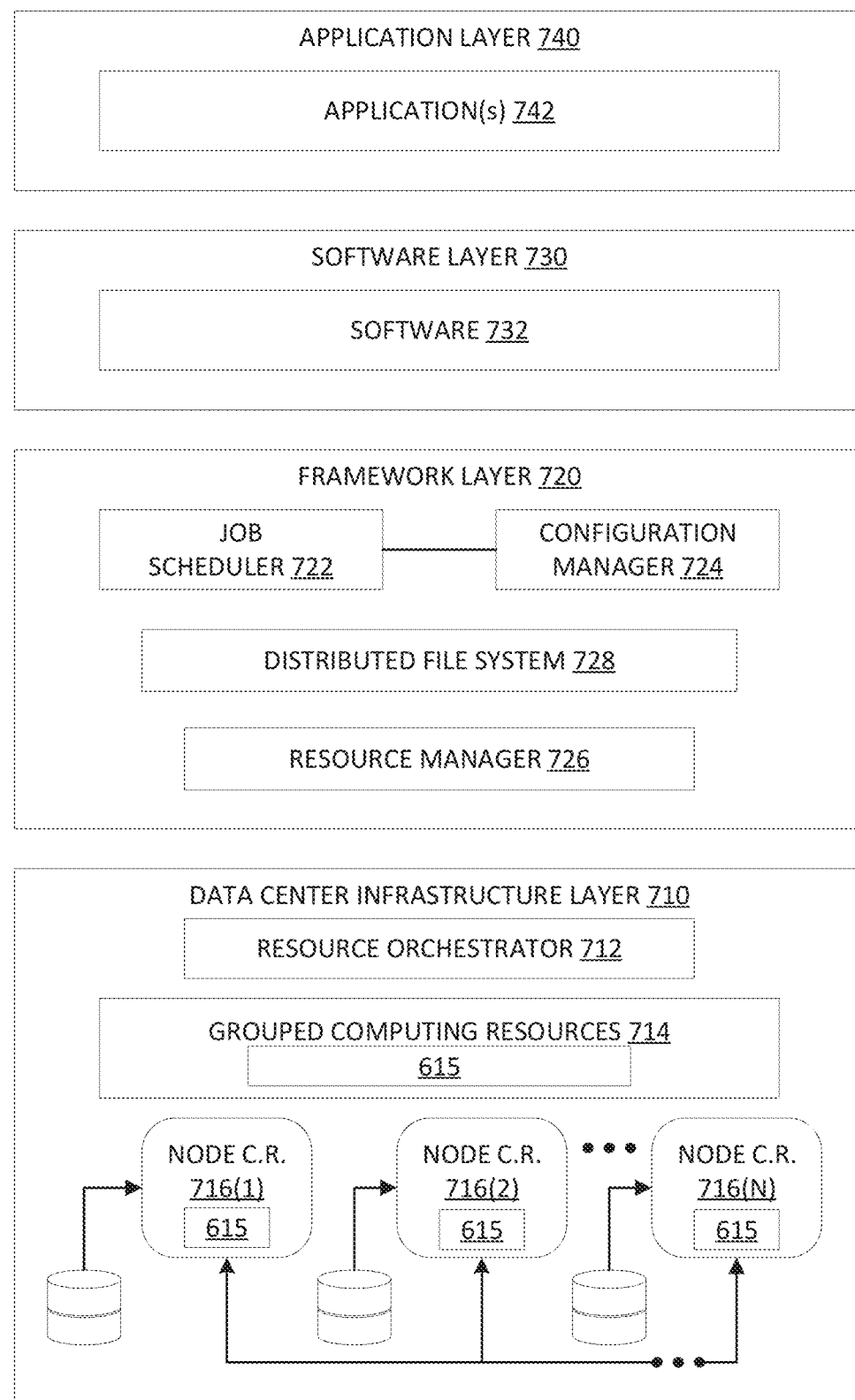
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 7 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Computer Systems

Figure 8:
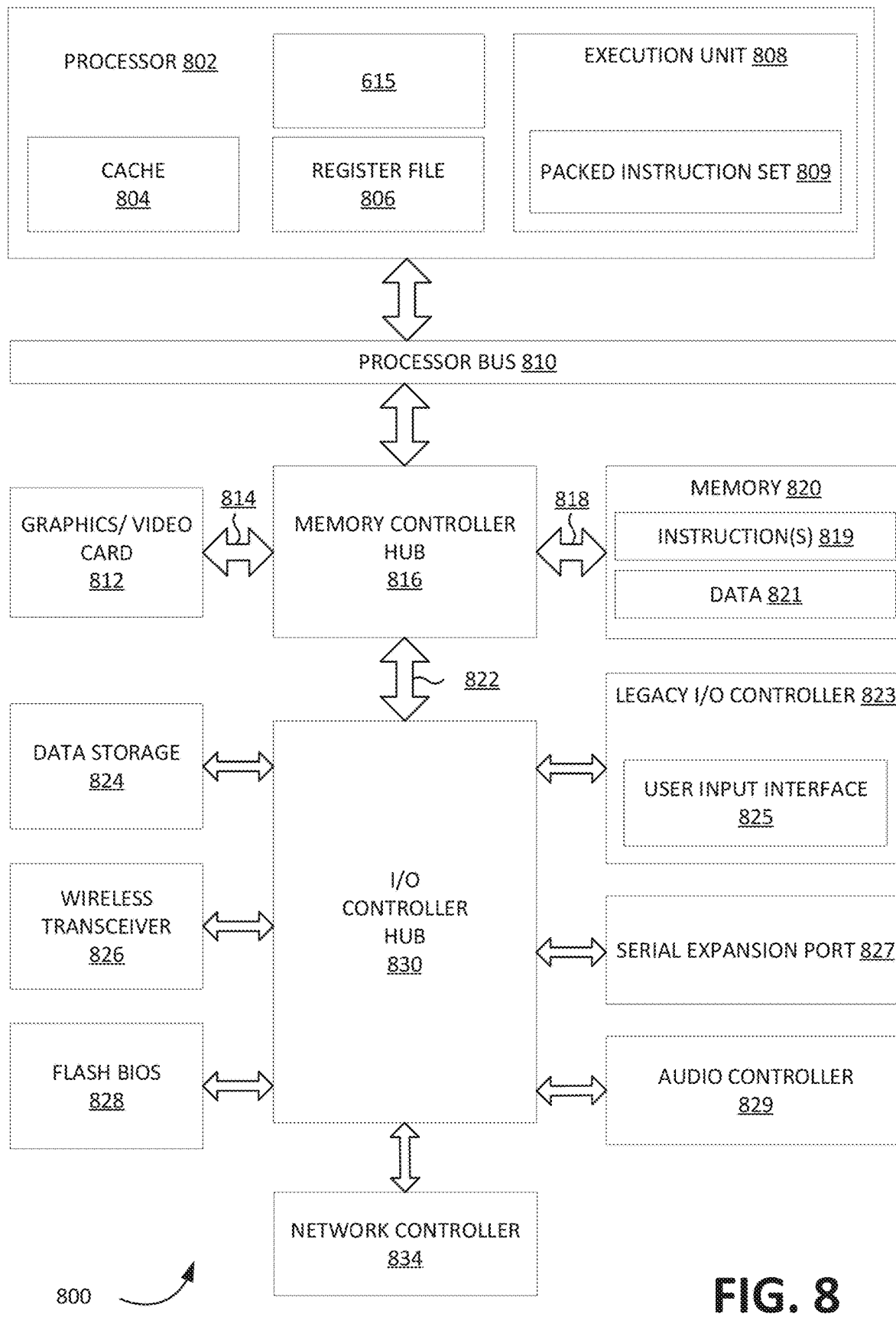
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834, which may include in some embodiments, a data processing unit. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips," whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 9:
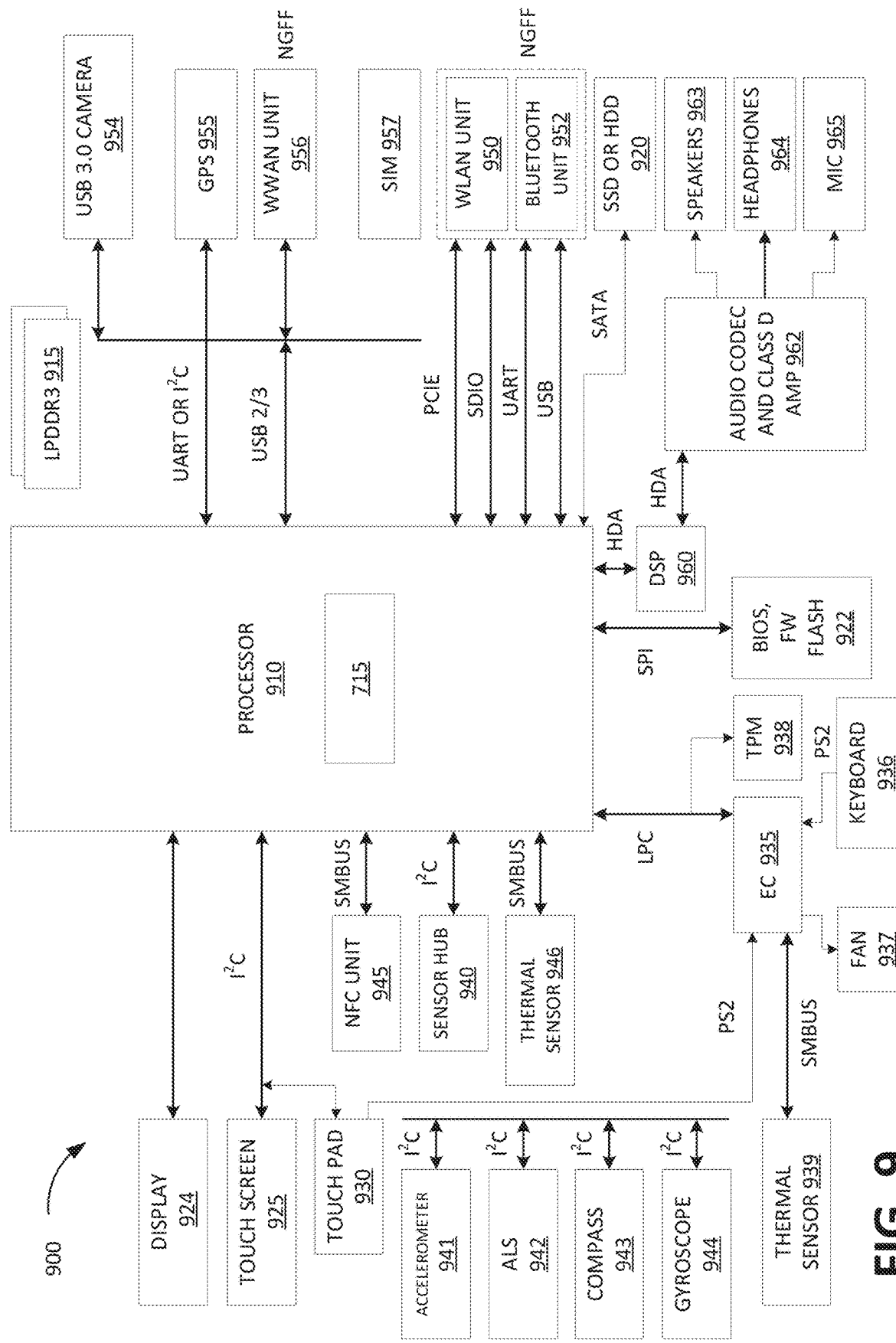
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips," whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 936, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 9 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 10:
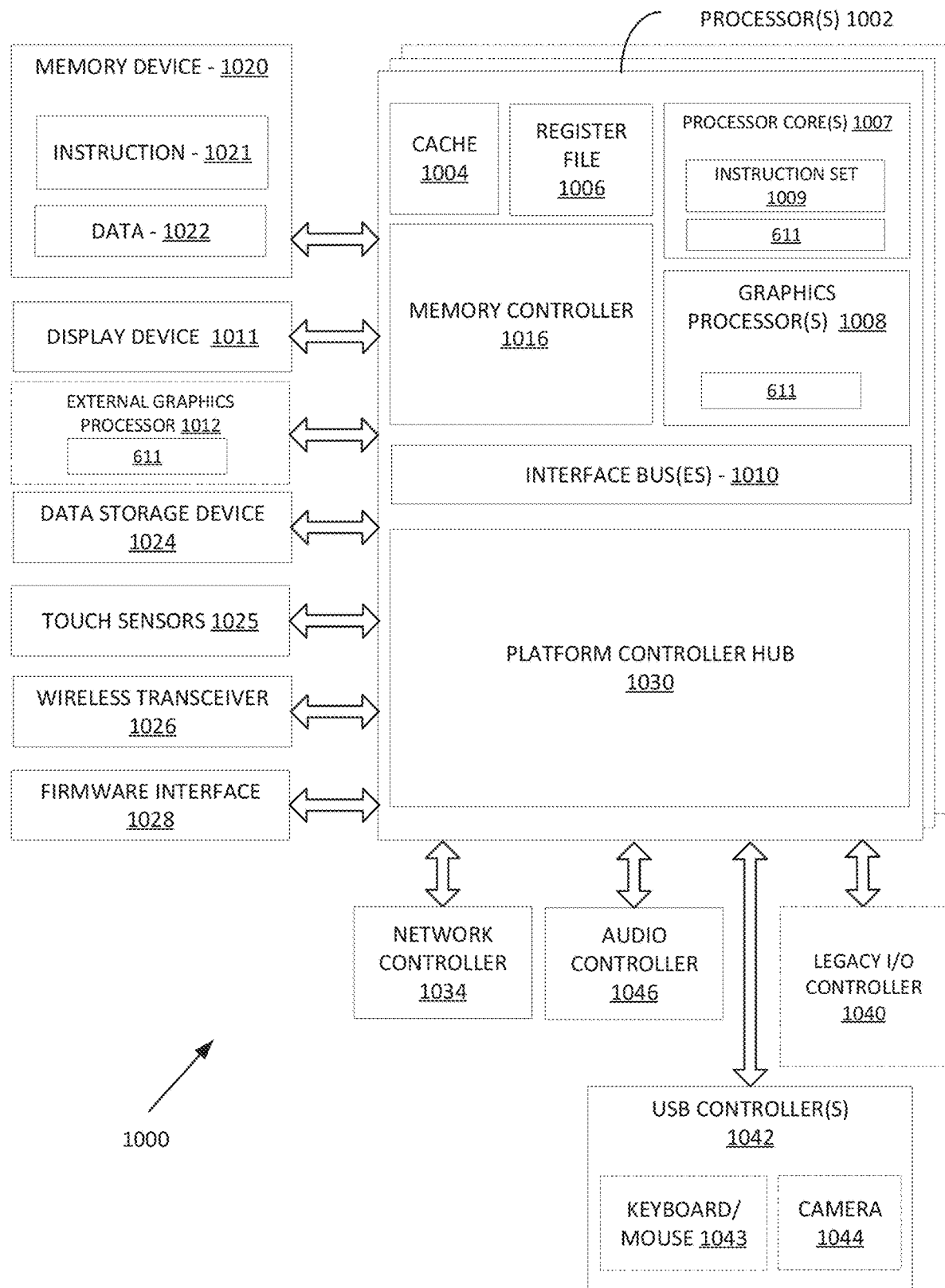
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, edge, or embedded devices.

In at least one embodiment, system 1000 may include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 may also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 may have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, may be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 may be a dynamic random access memory (DRAM) device, a static random access memory (SRAM) device, flash memory device, phase-change memory device, or some other memory device having suitable performance to serve as process memory. In at least one embodiment memory device 1020 may operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 may connect to processor(s) 1002. In at least one embodiment display device 1011 may include one or more of an internal display device, as in a mobile electronic device or a laptop device or an external display device attached via a display interface (e.g., DisplayPort, etc.). In at least one embodiment, display device 1011 may include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 may connect via a storage interface (e.g., SATA) or via a peripheral bus, such as a Peripheral Component Interconnect bus (e.g., PCI, PCI Express). In at least one embodiment, touch sensors 1025 may include touch screen sensors, pressure sensors, or fingerprint sensors. In at least one embodiment, wireless transceiver 1026 may be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and may be, for example, a unified extensible firmware interface (UEFI). In at least one embodiment, network controller 1034 may enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 may also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 may include an external memory controller 1016 and platform controller hub 1030, which may be configured as a memory controller hub and peripheral controller hub within a system chipset that is in communication with processor(s) 1002.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into graphics processor 1100. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 11:
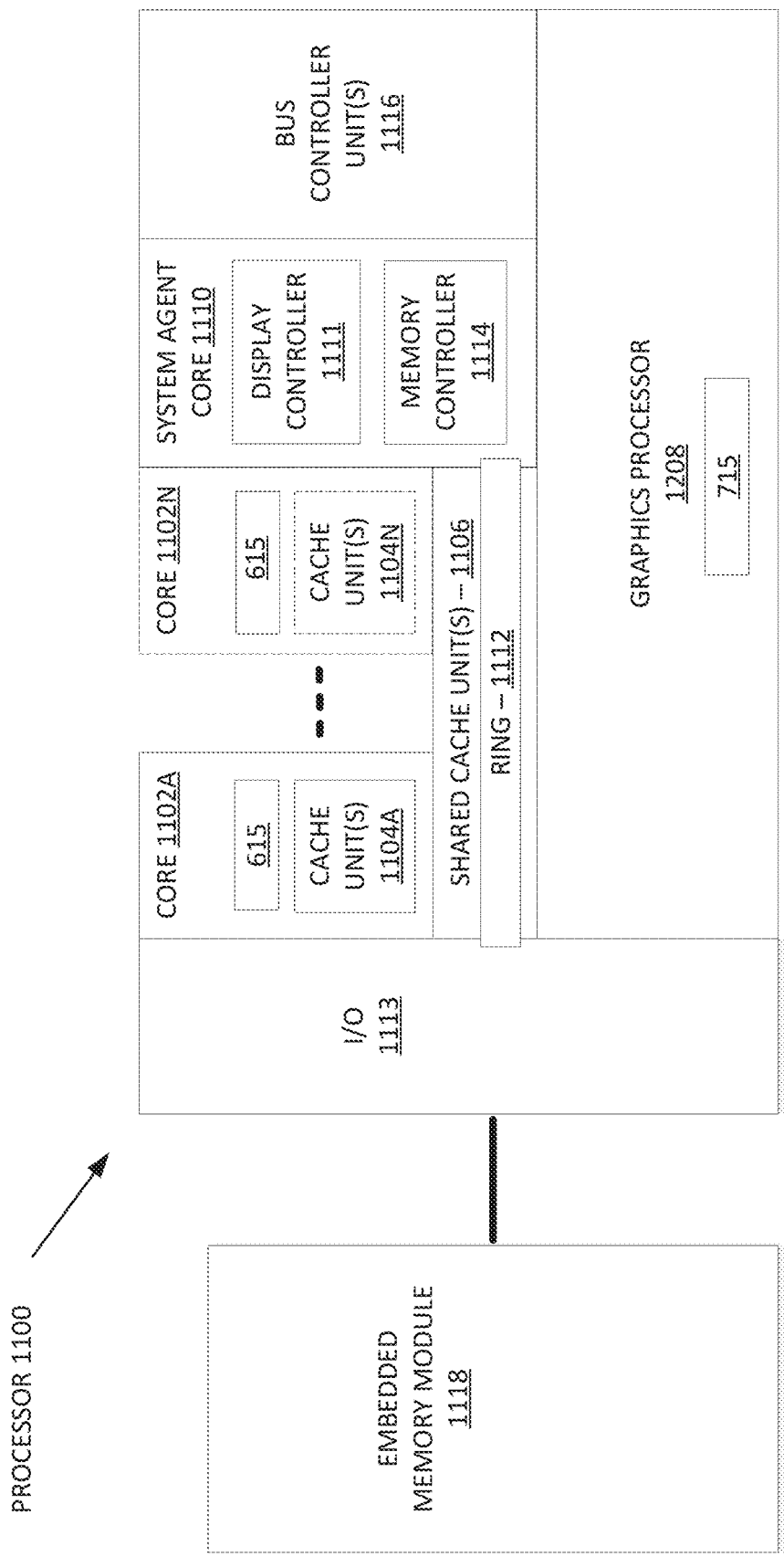
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 may include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 may be implemented on one or more chips or as a SoC integrated circuit.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into processor 1100. For example, in at least one embodiment, training and/or inferencing techniques described herein may use one or more of ALUs embodied in graphics processor 1108, graphics core(s) 1102A-1102N, or other components in FIG. 11. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of graphics processor 1100 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Virtualized Computing Platform

Figure 12:
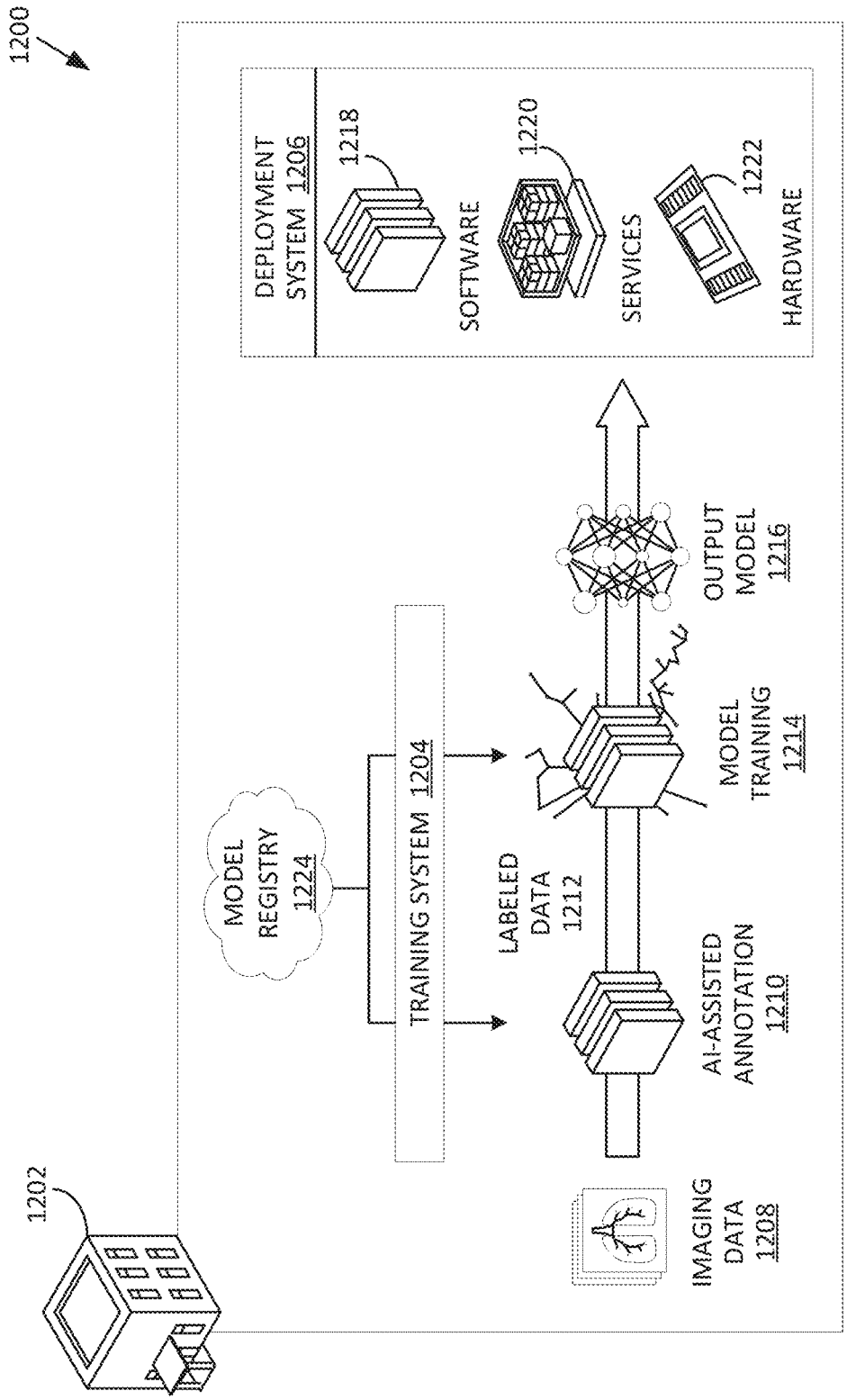
FIG. 12 is an example data flow diagram for an advanced computing pipeline, in accordance with at least one embodiment.

FIG. 12 is an example data flow diagram for a process 1200 of generating and deploying an image processing and inferencing pipeline, in accordance with at least one embodiment. In at least one embodiment, process 1200 may be deployed for use with imaging devices, processing devices, and/or other device types at one or more facilities 1202. Process 1200 may be executed within a training system 1204 and/or a deployment system 1206. In at least one embodiment, training system 1204 may be used to perform training, deployment, and implementation of machine learning models (e.g., neural networks, object detection algorithms, computer vision algorithms, etc.) for use in deployment system 1206. In at least one embodiment, deployment system 1206 may be configured to offload processing and compute resources among a distributed computing environment to reduce infrastructure requirements at facility 1202. In at least one embodiment, one or more applications in a pipeline may use or call upon services (e.g., inference, visualization, compute, AI, etc.) of deployment system 1206 during execution of applications.

In at least one embodiment, some of applications used in advanced processing and inferencing pipelines may use machine learning models or other AI to perform one or more processing steps. In at least one embodiment, machine learning models may be trained at facility 1202 using data 1208 (such as imaging data) generated at facility 1202 (and stored on one or more picture archiving and communication system (PACS) servers at facility 1202), may be trained using imaging or sequencing data 1208 from another facility(ies), or a combination thereof. In at least one embodiment, training system 1204 may be used to provide applications, services, and/or other resources for generating working, deployable machine learning models for deployment system 1206.

In at least one embodiment, model registry 1224 may be backed by object storage that may support versioning and object metadata. In at least one embodiment, object storage may be accessible through, for example, a cloud storage (e.g., cloud 1326 of FIG. 13) compatible application programming interface (API) from within a cloud platform. In at least one embodiment, machine learning models within model registry 1224 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1304 (FIG. 13) may include a scenario where facility 1202 is training their own machine learning model, or has an existing machine learning model that needs to be optimized or updated. In at least one embodiment, imaging data 1208 generated by imaging device(s), sequencing devices, and/or other device types may be received. In at least one embodiment, once imaging data 1208 is received, AI-assisted annotation 1210 may be used to aid in generating annotations corresponding to imaging data 1208 to be used as ground truth data for a machine learning model. In at least one embodiment, AI-assisted annotation 1210 may include one or more machine learning models (e.g., convolutional neural networks (CNNs)) that may be trained to generate annotations corresponding to certain types of imaging data 1208 (e.g., from certain devices). In at least one embodiment, AI-assisted annotations 1210 may then be used directly, or may be adjusted or fine-tuned using an annotation tool to generate ground truth data. In at least one embodiment, AI-assisted annotations 1210, labeled clinic data 1212, or a combination thereof may be used as ground truth data for training a machine learning model. In at least one embodiment, a trained machine learning model may be referred to as output model 1216, and may be used by deployment system 1206, as described herein.

In at least one embodiment, training pipeline 1304 (FIG. 13) may include a scenario where facility 1202 needs a machine learning model for use in performing one or more processing tasks for one or more applications in deployment system 1206, but facility 1202 may not currently have such a machine learning model (or may not have a model that is optimized, efficient, or effective for such purposes). In at least one embodiment, an existing machine learning model may be selected from a model registry 1224. In at least one embodiment, model registry 1224 may include machine learning models trained to perform a variety of different inference tasks on imaging data. In at least one embodiment, machine learning models in model registry 1224 may have been trained on imaging data from different facilities than facility 1202 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1224. In at least one embodiment, a machine learning model may then be retrained, or updated, at any number of other facilities, and a retrained or updated model may be made available in model registry 1224. In at least one embodiment, a machine learning model may then be selected from model registry 1224—and referred to as output model 1216—and may be used in deployment system 1206 to perform one or more processing tasks for one or more applications of a deployment system.

In at least one embodiment, training pipeline 1304 (FIG. 13), a scenario may include facility 1202 requiring a machine learning model for use in performing one or more processing tasks for one or more applications in deployment system 1206, but facility 1202 may not currently have such a machine learning model (or may not have a model that is optimized, efficient, or effective for such purposes). In at least one embodiment, a machine learning model selected from model registry 1224 may not be fine-tuned or optimized for imaging data 1208 generated at facility 1202 because of differences in populations, robustness of training data used to train a machine learning model, diversity in anomalies of training data, and/or other issues with training data. In at least one embodiment, AI-assisted annotation 1210 may be used to aid in generating annotations corresponding to imaging data 1208 to be used as ground truth data for retraining or updating a machine learning model. In at least one embodiment, labeled data 1212 may be used as ground truth data for training a machine learning model. In at least one embodiment, retraining or updating a machine learning model may be referred to as model training 1214. In at least one embodiment, model training 1214—e.g., AI-assisted annotations 1210, labeled clinic data 1212, or a combination thereof—may be used as ground truth data for retraining or updating a machine learning model. In at least one embodiment, a trained machine learning model may be referred to as output model 1216, and may be used by deployment system 1206, as described herein.

In at least one embodiment, deployment system 1206 may include software 1218, services 1220, hardware 1222, and/or other components, features, and functionality. In at least one embodiment, deployment system 1206 may include a software "stack," such that software 1218 may be built on top of services 1220 and may use services 1220 to perform some or all of processing tasks, and services 1220 and software 1218 may be built on top of hardware 1222 and use hardware 1222 to execute processing, storage, and/or other compute tasks of deployment system 1206. In at least one embodiment, software 1218 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1208, in addition to containers that receive and configure imaging data for use by each container and/or for use by facility 1202 after processing through a pipeline (e.g., to convert outputs back to a usable data type). In at least one embodiment, a combination of containers within software 1218 (e.g., that make up a pipeline) may be referred to as a virtual instrument (as described in more detail herein), and a virtual instrument may leverage services 1220 and hardware 1222 to execute some or all processing tasks of applications instantiated in containers.

In at least one embodiment, a data processing pipeline may receive input data (e.g., imaging data 1208) in a specific format in response to an inference request (e.g., a request from a user of deployment system 1206). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1216 of training system 1204.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1224 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1220 as a system (e.g., system 1300 of FIG. 13). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1300 (e.g., for accuracy), an application may be available in a container registry for selection and/or implementation by a user to perform one or more processing tasks with respect to data at a facility (e.g., a second facility) of a user.

Figure 13:
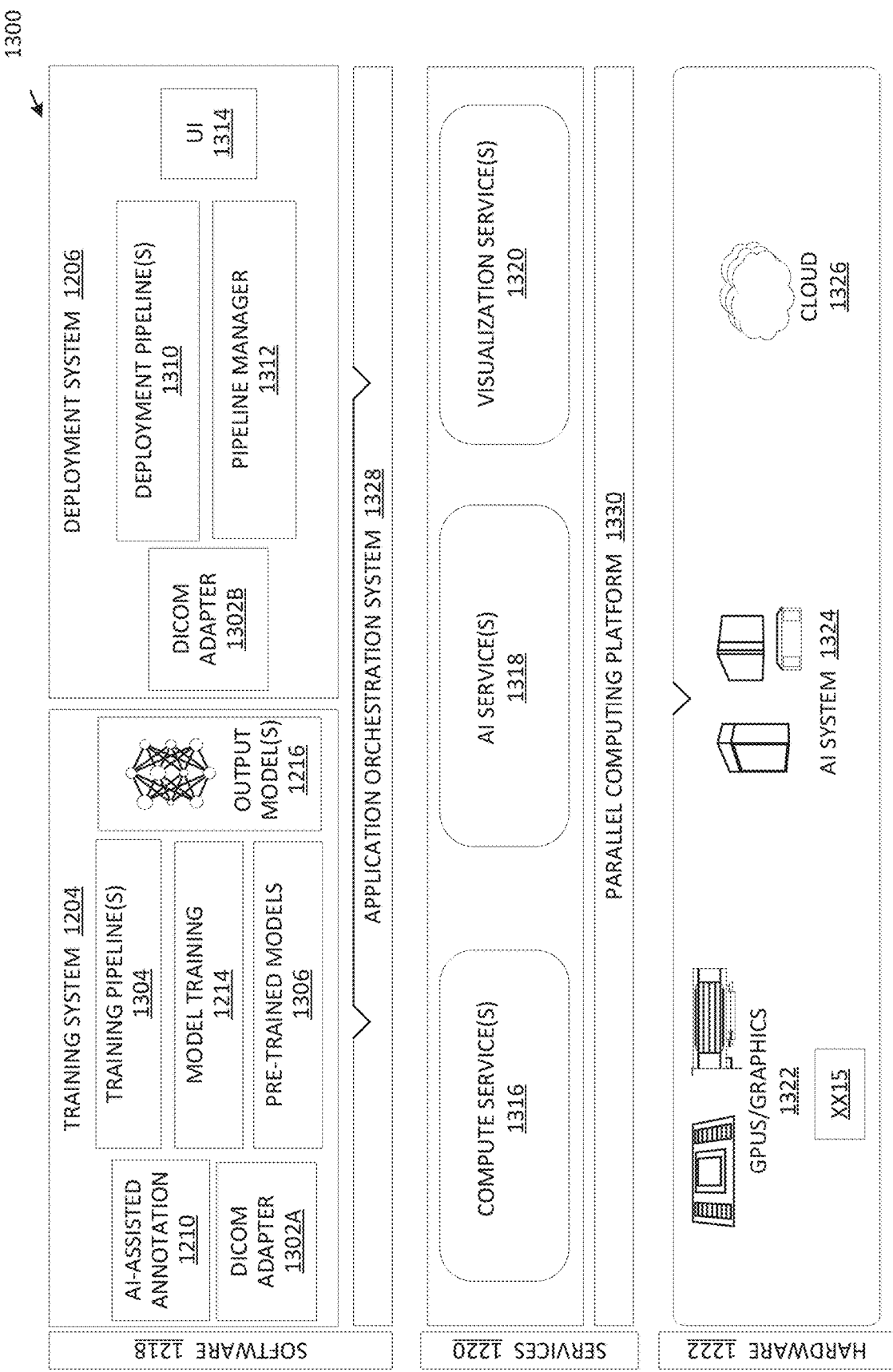
FIG. 13 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1300 of FIG. 13). In at least one embodiment, completed and validated applications or containers may be stored in a container registry and associated machine learning models may be stored in model registry 1224. In at least one embodiment, a requesting entity—who provides an inference or image processing request—may browse a container registry and/or model registry 1224 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1206 (e.g., a cloud) to perform processing of data processing pipeline. In at least one embodiment, processing by deployment system 1206 may include referencing selected elements (e.g., applications, containers, models, etc.) from a container registry and/or model registry 1224. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1220 may be leveraged. In at least one embodiment, services 1220 may include compute services, artificial intelligence (AI) services, visualization services, and/or other service types. In at least one embodiment, services 1220 may provide functionality that is common to one or more applications in software 1218, so functionality may be abstracted to a service that may be called upon or leveraged by applications. In at least one embodiment, functionality provided by services 1220 may run dynamically and more efficiently, while also scaling well by allowing applications to process data in parallel (e.g., using a parallel computing platform 1330 (FIG. 13)). In at least one embodiment, rather than each application that shares a same functionality offered by a service 1220 being required to have a respective instance of service 1220, service 1220 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1220 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1218 implementing advanced processing and inferencing pipeline that includes segmentation application and anomaly detection application may be streamlined because each application may call upon a same inference service to perform one or more inferencing tasks.

In at least one embodiment, hardware 1222 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1222 may be used to provide efficient, purpose-built support for software 1218 and services 1220 in deployment system 1206. In at least one embodiment, use of GPU processing may be implemented for processing locally (e.g., at facility 1202), within an AI/deep learning system, in a cloud system, and/or in other processing components of deployment system 1206 to improve efficiency, accuracy, and efficacy of image processing and generation. In at least one embodiment, software 1218 and/or services 1220 may be optimized for GPU processing with respect to deep learning, machine learning, and/or high-performance computing, as non-limiting examples. In at least one embodiment, at least some of computing environment of deployment system 1206 and/or training system 1204 may be executed in a datacenter one or more supercomputers or high performance computing systems, with GPU optimized software (e.g., hardware and software combination of NVIDIA's DGX System). In at least one embodiment, hardware 1222 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 13 is a system diagram for an example system 1300 for generating and deploying an imaging deployment pipeline, in accordance with at least one embodiment. In at least one embodiment, system 1300 may be used to implement process 1200 of FIG. 12 and/or other processes including advanced processing and inferencing pipelines. In at least one embodiment, system 1300 may include training system 1204 and deployment system 1206. In at least one embodiment, training system 1204 and deployment system 1206 may be implemented using software 1218, services 1220, and/or hardware 1222, as described herein.

In at least one embodiment, system 1300 (e.g., training system 1204 and/or deployment system 1206) may implemented in a cloud computing environment (e.g., using cloud 1326). In at least one embodiment, system 1300 may be implemented locally with respect to a healthcare services facility, or as a combination of both cloud and local computing resources. In at least one embodiment, access to APIs in cloud 1326 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1300, may be restricted to a set of public IPs that have been vetted or authorized for interaction.

In at least one embodiment, various components of system 1300 may communicate between and among one another using any of a variety of different network types, including but not limited to local area networks (LANs) and/or wide area networks (WANs) via wired and/or wireless communication protocols. In at least one embodiment, communication between facilities and components of system 1300 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1204 may execute training pipelines 1304, similar to those described herein with respect to FIG. 12. In at least one embodiment, where one or more machine learning models are to be used in deployment pipelines 1310 by deployment system 1206, training pipelines 1304 may be used to train or retrain one or more (e.g. pre-trained) models, and/or implement one or more of pre-trained models 1306 (e.g., without a need for retraining or updating). In at least one embodiment, as a result of training pipelines 1304, output model(s) 1216 may be generated. In at least one embodiment, training pipelines 1304 may include any number of processing steps, such as but not limited to imaging data (or other input data) conversion or adaption In at least one embodiment, for different machine learning models used by deployment system 1206, different training pipelines 1304 may be used. In at least one embodiment, training pipeline 1304 similar to a first example described with respect to FIG. 12 may be used for a first machine learning model, training pipeline 1304 similar to a second example described with respect to FIG. 12 may be used for a second machine learning model, and training pipeline 1304 similar to a third example described with respect to FIG. 12 may be used for a third machine learning model. In at least one embodiment, any combination of tasks within training system 1204 may be used depending on what is required for each respective machine learning model. In at least one embodiment, one or more of machine learning models may already be trained and ready for deployment so machine learning models may not undergo any processing by training system 1204, and may be implemented by deployment system 1206.

In at least one embodiment, output model(s) 1216 and/or pre-trained model(s) 1306 may include any types of machine learning models depending on implementation or embodiment. In at least one embodiment, and without limitation, machine learning models used by system 1300 may include machine learning model(s) using linear regression, logistic regression, decision trees, support vector machines (SVM), Naïve Bayes, k-nearest neighbor (KNN), K means clustering, random forest, dimensionality reduction algorithms, gradient boosting algorithms, neural networks (e.g., autoencoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 14A:
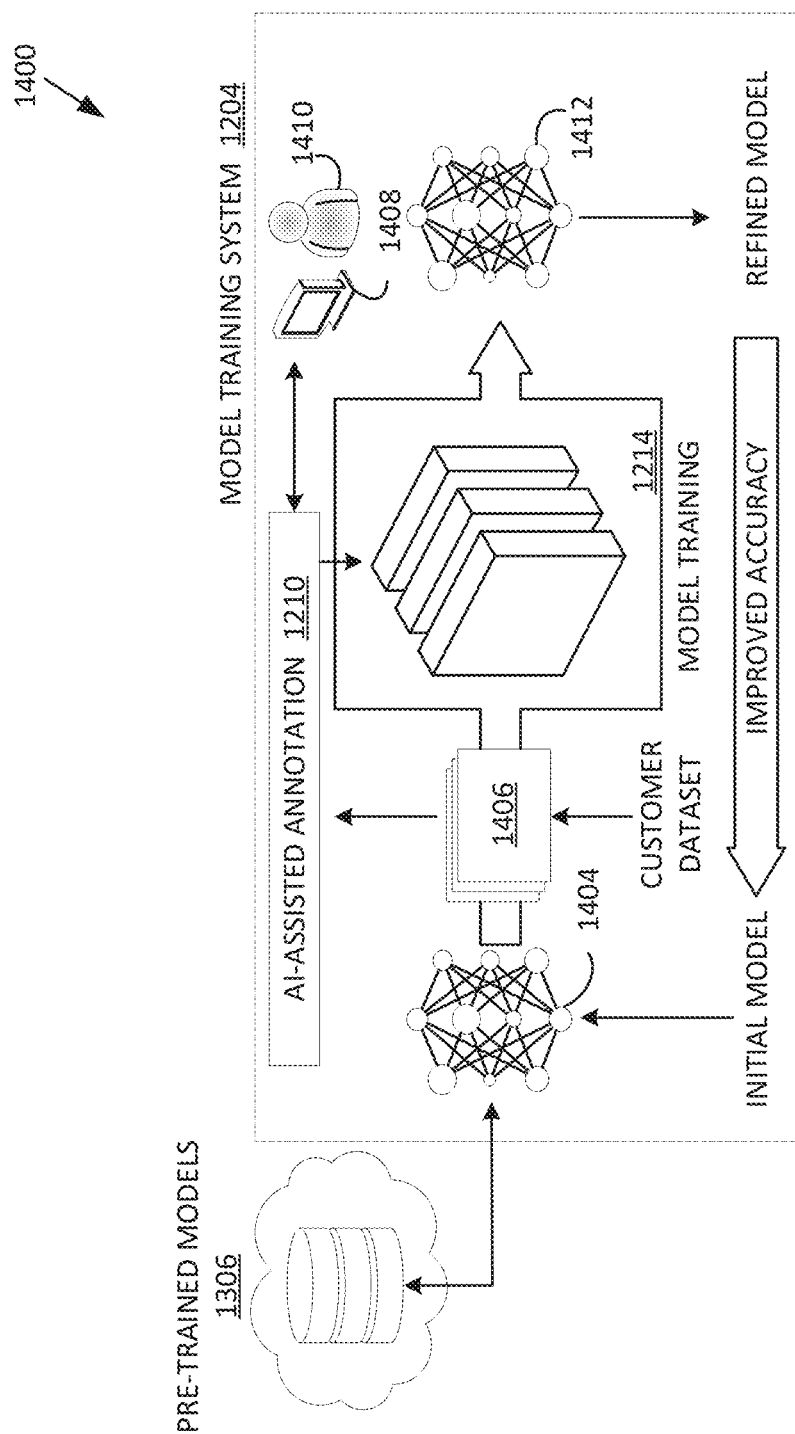
FIGS. 14A and 14B illustrate a data flow diagram for a process to train a machine learning model, as well as client-server architecture to enhance annotation tools with pre-trained annotation models, in accordance with at least one embodiment.
Figure 14B:
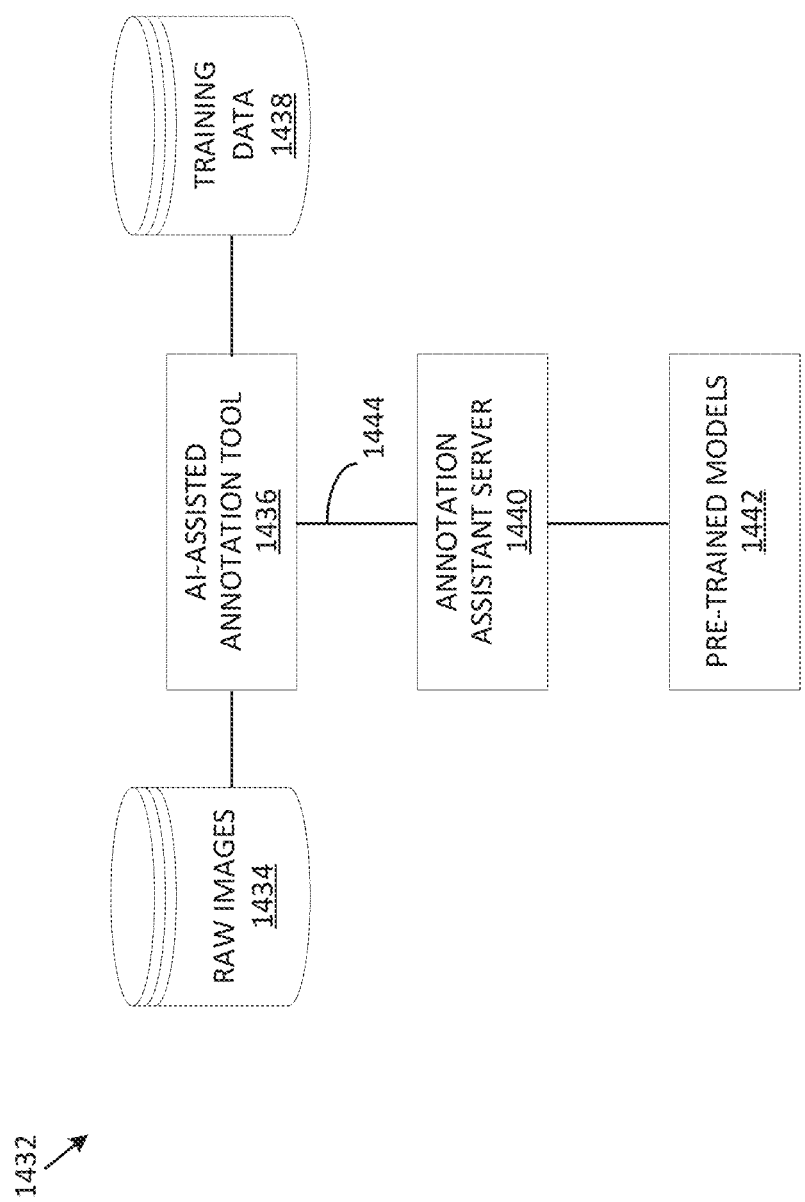

In at least one embodiment, training pipelines 1304 may include AI-assisted annotation, as described in more detail herein with respect to at least FIG. 14B. In at least one embodiment, labeled data 1212 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1208 (or other data type used by machine learning models), there may be corresponding ground truth data generated by training system 1204. In at least one embodiment, AI-assisted annotation may be performed as part of deployment pipelines 1310; either in addition to, or in lieu of AI-assisted annotation included in training pipelines 1304. In at least one embodiment, system 1300 may include a multi-layer platform that may include a software layer (e.g., software 1218) of diagnostic applications (or other application types) that may perform one or more medical imaging and diagnostic functions. In at least one embodiment, system 1300 may be communicatively coupled to (e.g., via encrypted links) PACS server networks of one or more facilities. In at least one embodiment, system 1300 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1202). In at least one embodiment, applications may then call or execute one or more services 1220 for performing compute, AI, or visualization tasks associated with respective applications, and software 1218 and/or services 1220 may leverage hardware 1222 to perform processing tasks in an effective and efficient manner.

In at least one embodiment, deployment system 1206 may execute deployment pipelines 1310. In at least one embodiment, deployment pipelines 1310 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1310 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1310 depending on information desired from data generated by a device. In at least one embodiment, where detections of anomalies are desired from an MRI machine, there may be a first deployment pipeline 1310, and where image enhancement is desired from output of an MRI machine, there may be a second deployment pipeline 1310.

In at least one embodiment, an image generation application may include a processing task that includes use of a machine learning model. In at least one embodiment, a user may desire to use their own machine learning model, or to select a machine learning model from model registry 1224. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1300—such as services 1220 and hardware 1222—deployment pipelines 1310 may be even more user friendly, provide for easier integration, and produce more accurate, efficient, and timely results.

In at least one embodiment, deployment system 1206 may include a user interface 1314 (e.g., a graphical user interface, a web interface, etc.) that may be used to select applications for inclusion in deployment pipeline(s) 1310, arrange applications, modify, or change applications or parameters or constructs thereof, use and interact with deployment pipeline(s) 1310 during set-up and/or deployment, and/or to otherwise interact with deployment system 1206. In at least one embodiment, although not illustrated with respect to training system 1204, user interface 1314 (or a different user interface) may be used for selecting models for use in deployment system 1206, for selecting models for training, or retraining, in training system 1204, and/or for otherwise interacting with training system 1204.

In at least one embodiment, pipeline manager 1312 may be used, in addition to an application orchestration system 1328, to manage interaction between applications or containers of deployment pipeline(s) 1310 and services 1220 and/or hardware 1222. In at least one embodiment, pipeline manager 1312 may be configured to facilitate interactions from application to application, from application to service 1220, and/or from application or service to hardware 1222. In at least one embodiment, although illustrated as included in software 1218, this is not intended to be limiting, and in some examples (e.g., as illustrated in FIG. 11) pipeline manager 1312 may be included in services 1220. In at least one embodiment, application orchestration system 1328 (e.g., Kubernetes, DOCKER, etc.) may include a container orchestration system that may group applications into containers as logical units for coordination, management, scaling, and deployment. In at least one embodiment, by associating applications from deployment pipeline(s) 1310 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1312 and application orchestration system 1328. In at least one embodiment, so long as an expected input and/or output of each container or application is known by a system (e.g., based on constructs of applications or containers), application orchestration system 1328 and/or pipeline manager 1312 may facilitate communication among and between, and sharing of resources among and between, each of applications or containers. In at least one embodiment, because one or more of applications or containers in deployment pipeline(s) 1310 may share same services and resources, application orchestration system 1328 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1328) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1220 leveraged by and shared by applications or containers in deployment system 1206 may include compute services 1316, AI services 1318, visualization services 1320, and/or other service types. In at least one embodiment, applications may call (e.g., execute) one or more of services 1220 to perform processing operations for an application. In at least one embodiment, compute services 1316 may be leveraged by applications to perform super-computing or other high-performance computing (HPC) tasks. In at least one embodiment, compute service(s) 1316 may be leveraged to perform parallel processing (e.g., using a parallel computing platform 1330) for processing data through one or more of applications and/or one or more tasks of a single application, substantially simultaneously. In at least one embodiment, parallel computing platform 1330 (e.g., NVIDIA's CUDA) may enable general purpose computing on GPUs (GPGPU) (e.g., GPUs 1322). In at least one embodiment, a software layer of parallel computing platform 1330 may provide access to virtual instruction sets and parallel computational elements of GPUs, for execution of compute kernels. In at least one embodiment, parallel computing platform 1330 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1330 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1318 may be leveraged to perform inferencing services for executing machine learning model(s) associated with applications (e.g., tasked with performing one or more processing tasks of an application). In at least one embodiment, AI services 1318 may leverage AI system 1324 to execute machine learning model(s) (e.g., neural networks, such as CNNs) for segmentation, reconstruction, object detection, feature detection, classification, and/or other inferencing tasks. In at least one embodiment, applications of deployment pipeline(s) 1310 may use one or more of output models 1216 from training system 1204 and/or other models of applications to perform inference on imaging data. In at least one embodiment, two or more examples of inferencing using application orchestration system 1328 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1328 may distribute resources (e.g., services 1220 and/or hardware 1222) based on priority paths for different inferencing tasks of AI services 1318.

In at least one embodiment, shared storage may be mounted to AI services 1318 within system 1300. In at least one embodiment, shared storage may operate as a cache (or other storage device type) and may be used to process inference requests from applications. In at least one embodiment, when an inference request is submitted, a request may be received by a set of API instances of deployment system 1206, and one or more instances may be selected (e.g., for best fit, for load balancing, etc.) to process a request. In at least one embodiment, to process a request, a request may be entered into a database, a machine learning model may be located from model registry 1224 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1312) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT <1 min) priority while others may have lower priority (e.g., TAT <12 min). In at least one embodiment, model execution times may be measured from requesting institution or entity and may include partner network traversal time, as well as execution on an inference service.

In at least one embodiment, transfer of requests between services 1220 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1326, and an inference service may perform inferencing on a GPU.

In at least one embodiment, visualization services 1320 may be leveraged to generate visualizations for viewing outputs of applications and/or deployment pipeline(s) 1310. In at least one embodiment, GPUs 1322 may be leveraged by visualization services 1320 to generate visualizations. In at least one embodiment, rendering effects, such as ray-tracing, may be implemented by visualization services 1320 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1320 may include an internal visualizer, cinematics, and/or other rendering or image processing capabilities or functionality (e.g., ray tracing, rasterization, internal optics, etc.).

In at least one embodiment, hardware 1222 may include GPUs 1322, AI system 1324, cloud 1326, and/or any other hardware used for executing training system 1204 and/or deployment system 1206. In at least one embodiment, GPUs 1322 (e.g., NVIDIA's TESLA and/or QUADRO GPUs) may include any number of GPUs that may be used for executing processing tasks of compute services 1316, AI services 1318, visualization services 1320, other services, and/or any of features or functionality of software 1218. For example, with respect to AI services 1318, GPUs 1322 may be used to perform pre-processing on imaging data (or other data types used by machine learning models), post-processing on outputs of machine learning models, and/or to perform inferencing (e.g., to execute machine learning models). In at least one embodiment, cloud 1326, AI system 1324, and/or other components of system 1300 may use GPUs 1322. In at least one embodiment, cloud 1326 may include a GPU-optimized platform for deep learning tasks. In at least one embodiment, AI system 1324 may use GPUs, and cloud 1326—or at least a portion tasked with deep learning or inferencing—may be executed using one or more AI systems 1324. As such, although hardware 1222 is illustrated as discrete components, this is not intended to be limiting, and any components of hardware 1222 may be combined with, or leveraged by, any other components of hardware 1222.

In at least one embodiment, AI system 1324 may include a purpose-built computing system (e.g., a super-computer or an HPC) configured for inferencing, deep learning, machine learning, and/or other artificial intelligence tasks. In at least one embodiment, AI system 1324 (e.g., NVIDIA's DGX) may include GPU-optimized software (e.g., a software stack) that may be executed using a plurality of GPUs 1322, in addition to DPUs, CPUs, RAM, storage, and/or other components, features, or functionality. In at least one embodiment, one or more AI systems 1324 may be implemented in cloud 1326 (e.g., in a data center) for performing some or all of AI-based processing tasks of system 1300.

In at least one embodiment, cloud 1326 may include a GPU-accelerated infrastructure (e.g., NVIDIA's NGC) that may provide a GPU-optimized platform for executing processing tasks of system 1300. In at least one embodiment, cloud 1326 may include an AI system(s) 1324 for performing one or more of AI-based tasks of system 1300 (e.g., as a hardware abstraction and scaling platform). In at least one embodiment, cloud 1326 may integrate with application orchestration system 1328 leveraging multiple GPUs to enable seamless scaling and load balancing between and among applications and services 1220. In at least one embodiment, cloud 1326 may tasked with executing at least some of services 1220 of system 1300, including compute services 1316, AI services 1318, and/or visualization services 1320, as described herein. In at least one embodiment, cloud 1326 may perform small and large batch inference (e.g., executing NVIDIA's TENSOR RT), provide an accelerated parallel computing API and platform 1330 (e.g., NVIDIA's CUDA), execute application orchestration system 1328 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1300.

FIG. 14A illustrates a data flow diagram for a process 1400 to train, retrain, or update a machine learning model, in accordance with at least one embodiment. In at least one embodiment, process 1400 may be executed using, as a non-limiting example, system 1300 of FIG. 13. In at least one embodiment, process 1400 may leverage services 1220 and/or hardware 1222 of system 1300, as described herein. In at least one embodiment, refined models 1412 generated by process 1400 may be executed by deployment system 1206 for one or more containerized applications in deployment pipelines 1310.

In at least one embodiment, model training 1214 may include retraining or updating an initial model 1404 (e.g., a pre-trained model) using new training data (e.g., new input data, such as customer dataset 1406, and/or new ground truth data associated with input data). In at least one embodiment, to retrain, or update, initial model 1404, output or loss layer(s) of initial model 1404 may be reset, or deleted, and/or replaced with an updated or new output or loss layer(s). In at least one embodiment, initial model 1404 may have previously fine-tuned parameters (e.g., weights and/or biases) that remain from prior training, so training or retraining 1214 may not take as long or require as much processing as training a model from scratch. In at least one embodiment, during model training 1214, by having reset or replaced output or loss layer(s) of initial model 1404, parameters may be updated and re-tuned for a new data set based on loss calculations associated with accuracy of output or loss layer(s) at generating predictions on new, customer dataset 1406 (e.g., image data 1208 of FIG. 12).

In at least one embodiment, pre-trained models 1306 may be stored in a data store, or registry (e.g., model registry 1224 of FIG. 12). In at least one embodiment, pre-trained models 1306 may have been trained, at least in part, at one or more facilities other than a facility executing process 1400. In at least one embodiment, to protect privacy and rights of patients, subjects, or clients of different facilities, pre-trained models 1306 may have been trained, on-premise, using customer or patient data generated on-premise. In at least one embodiment, pre-trained models 1306 may be trained using cloud 1326 and/or other hardware 1222, but confidential, privacy protected patient data may not be transferred to, used by, or accessible to any components of cloud 1326 (or other off premise hardware). In at least one embodiment, where a pre-trained model 1306 is trained at using patient data from more than one facility, pre-trained model 1306 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1306 on-premise and/or off premise, such as in a datacenter or other cloud computing infrastructure.

In at least one embodiment, when selecting applications for use in deployment pipelines 1310, a user may also select machine learning models to be used for specific applications. In at least one embodiment, a user may not have a model for use, so a user may select a pre-trained model 1306 to use with an application. In at least one embodiment, pre-trained model 1306 may not be optimized for generating accurate results on customer dataset 1406 of a facility of a user (e.g., based on patient diversity, demographics, types of medical imaging devices used, etc.). In at least one embodiment, prior to deploying pre-trained model 1306 into deployment pipeline 1310 for use with an application(s), pre-trained model 1306 may be updated, retrained, and/or fine-tuned for use at a respective facility.

In at least one embodiment, a user may select pre-trained model 1306 that is to be updated, retrained, and/or fine-tuned, and pre-trained model 1306 may be referred to as initial model 1404 for training system 1204 within process 1400. In at least one embodiment, customer dataset 1406 (e.g., imaging data, genomics data, sequencing data, or other data types generated by devices at a facility) may be used to perform model training 1214 (which may include, without limitation, transfer learning) on initial model 1404 to generate refined model 1412. In at least one embodiment, ground truth data corresponding to customer dataset 1406 may be generated by training system 1204. In at least one embodiment, ground truth data may be generated, at least in part, by clinicians, scientists, doctors, practitioners, at a facility (e.g., as labeled clinic data 1212 of FIG. 12).

In at least one embodiment, AI-assisted annotation 1210 may be used in some examples to generate ground truth data. In at least one embodiment, AI-assisted annotation 1210 (e.g., implemented using an AI-assisted annotation SDK) may leverage machine learning models (e.g., neural networks) to generate suggested or predicted ground truth data for a customer dataset. In at least one embodiment, user 1410 may use annotation tools within a user interface (a graphical user interface (GUI)) on computing device 1408.

In at least one embodiment, user 1410 may interact with a GUI via computing device 1408 to edit or fine-tune (auto)annotations. In at least one embodiment, a polygon editing feature may be used to move vertices of a polygon to more accurate or fine-tuned locations.

In at least one embodiment, once customer dataset 1406 has associated ground truth data, ground truth data (e.g., from AI-assisted annotation, manual labeling, etc.) may be used by during model training 1214 to generate refined model 1412. In at least one embodiment, customer dataset 1406 may be applied to initial model 1404 any number of times, and ground truth data may be used to update parameters of initial model 1404 until an acceptable level of accuracy is attained for refined model 1412. In at least one embodiment, once refined model 1412 is generated, refined model 1412 may be deployed within one or more deployment pipelines 1310 at a facility for performing one or more processing tasks with respect to medical imaging data.

In at least one embodiment, refined model 1412 may be uploaded to pre-trained models 1306 in model registry 1224 to be selected by another facility. In at least one embodiment, his process may be completed at any number of facilities such that refined model 1412 may be further refined on new datasets any number of times to generate a more universal model.

FIG. 14B is an example illustration of a client-server architecture 1432 to enhance annotation tools with pre-trained annotation models, in accordance with at least one embodiment. In at least one embodiment, AI-assisted annotation tools 1436 may be instantiated based on a client-server architecture 1432. In at least one embodiment, annotation tools 1436 in imaging applications may aid radiologists, for example, identify organs and abnormalities. In at least one embodiment, imaging applications may include software tools that help user 1410 to identify, as a non-limiting example, a few extreme points on a particular organ of interest in raw images 1434 (e.g., in a 3D MRI or CT scan) and receive auto-annotated results for all 2D slices of a particular organ. In at least one embodiment, results may be stored in a data store as training data 1438 and used as (for example and without limitation) ground truth data for training. In at least one embodiment, when computing device 1408 sends extreme points for AI-assisted annotation 1210, a deep learning model, for example, may receive this data as input and return inference results of a segmented organ or abnormality. In at least one embodiment, pre-instantiated annotation tools, such as AI-Assisted Annotation Tool 1436B in FIG. 14B, may be enhanced by making API calls (e.g., API Call 1444) to a server, such as an Annotation Assistant Server 1440 that may include a set of pre-trained models 1442 stored in an annotation model registry, for example. In at least one embodiment, an annotation model registry may store pre-trained models 1442 (e.g., machine learning models, such as deep learning models) that are pre-trained to perform AI-assisted annotation on a particular organ or abnormality. These models may be further updated by using training pipelines 1304. In at least one embodiment, pre-installed annotation tools may be improved over time as new labeled clinic data 1212 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   detecting that a set of shader programs are to be compiled for an application executing at a computing system using a first set of processing devices;
   determining a first processing state associated with the first set of processing devices in view of one or more characteristics associated with the set of shader programs;
   determining whether the first processing state satisfies a processing state criterion associated with the application;
   responsive to determining that the first processing state satisfies the processing state criterion, identifying a second set of processing devices to compile the set of shader programs, wherein each of the second set of processing devices is different from any processing device of the first set of processing devices;
   providing the set of shader programs for compilation using the second set of processing devices in view of state data associated with the computing system to obtain a set of complied shader programs; and
   causing the set of compiled shader programs to be executed using the first set of processing devices.

2. The method of claim 1, further comprising:
   prior to detecting that the set of shader programs are to be compiled for the application running at the computing system, compiling the set of shader programs using the first set of processing devices to generate an initial set of compiled shader programs,
   wherein the set of compiled shader programs generated based on the compilation using the second set of processing devices is an optimized version of the initial set of compiled shader programs.

3. The method of claim 2, further comprising:
   providing a set of optimization parameters associated with the application with the set of shader programs for compilation using the second set of processing devices, wherein the set of compiled shader programs is further generated based on the set of optimization parameters.

4. The method of claim 1, further comprising:
   determining a second processing state associated with the second set of processing devices in view of the one or more characteristics associated with the set of shader programs; and
   determining whether the second processing state satisfies the processing state criterion,
   wherein the set of shader programs is provided for compilation using the second set of processing devices responsive to determining that the second processing state satisfies the processing state criterion.

5. The method of claim 1, wherein the first set of processing devices comprises a first processing unit of the computing system and the second set of processing devices comprises at least one of a second processing unit of the computing system that is separate from the first processing unit or a third processing unit of a processing system that is remote from the computing system.

6. The method of claim 5, wherein the third processing unit comprises a data processing unit of a data center.

7. The method of claim 1, wherein the state data associated with the computing system comprises at least one of: at least a portion of a pipeline state of the computing system, a hardware state of the computing system, or a driver state of the computing system.

8. A system comprising:
   a memory device; and
   a processing device coupled to the memory device, the processing device to perform operations comprising:
      detecting that a set of shader programs are to be compiled for an application running using a first set of processing devices;
      providing the set of shader programs for compilation using the first set of processing devices to obtain a first set of compiled shader programs;
      designating the first set of compiled shader programs for execution by the first set of processing devices in response to a reference of the set of shader programs by the application;
      providing the set of shader programs for compilation using a second set of processing devices to obtain a second set of compiled shader programs, wherein each of the second set of processing devices is different from any processing device of the first set of processing devices, and wherein the second set of compiled shader programs is an optimized version of the first set of compiled shader programs; and
      replacing the designation of the first set of compiled shader programs with a designation of the second set of compiled shader program for execution in response to the reference of the set of shader programs by the application.

9. The system of claim 8, wherein the first set of compiled shader programs meets at least one of a minimum operating condition or a minimum performance condition associated with the application, and wherein the second set of compiled shader programs meets at least one of a target operating condition or a target performance condition associated with the application.

10. The system of claim 8, wherein a set of optimization parameters are provided with the set of shader programs for compilation using the second set of processing devices, the set of optimization parameters corresponding to at least one of a target rendering quality condition, a target efficiency condition, or a target latency condition.

11. The system of claim 8, wherein the first set of compiled shader programs and the second set of compiled shader programs are compiled in view of state data associated with the first set of processing devices, the state data comprising at least one of: a pipeline state of the first set of processing devices, a hardware state of the first set of processing devices, or a driver state of the first set of processing devices.

12. The system of claim 8, wherein the first set of processing devices includes a first processing unit and the second set of processing devices comprises at least one of a second processing unit that is separate from the first processing unit or a third processing unit of a processing system that is remote from the first set of processing devices.

13. The system of claim 8, wherein the processing device is included in the first set of processing devices.

14. A non-transitory computer-readable medium storing instructions thereon, wherein the instructions, when executed by a processing device, cause the processing device to:
- detect that a set of shader programs are to be compiled for an application running at a computing system using a first set of processing devices;
- determine a first processing state associated with the first processing devices in view of one or more characteristics associated with the set of shader programs;
- determine whether the first processing state satisfies a processing state criterion associated with the application;
- responsive to determining that that the first processing state satisfies the processing state criterion, identify a second set of processing devices to compile the set of shader programs, wherein each of the second set of processing devices is different from any processing device of the first set of processing devices;
- provide the set of shader programs for compilation using the second set of processing devices in view of state data associated with the computing system to obtain a set of complied shader programs; and
- cause the set of compiled shader programs to be executed using the first set of processing devices.

15. The non-transitory computer-readable medium of claim 14, wherein the processing device is further to:
- prior to detecting that the set of shader programs are to be compiled for the application running at the computing system, compile the set of shader programs using the first set of processing devices to generate an initial set of compiled shader programs,
- wherein the set of compiled shader programs generated based on the compilation using the second set of processing devices is an optimized version of the initial set of compiled shader programs.

16. The non-transitory computer-readable medium of claim 15, wherein the processing device is further to:
- provide a set of optimization parameters associated with the application with the set of shader programs for compilation using the second set of processing devices, wherein the set of compiled shader programs is further generated based on the set of optimization parameters.

17. The non-transitory computer-readable medium of claim 14, wherein the processing device is further to:
- determine a second processing state associated with the second set of processing devices in view of the one or more characteristics associated with the set of shader programs; and
- determine whether the second processing state satisfies the processing state criterion,
- wherein the set of shader programs is provided for compilation using the second set of processing devices responsive to determining that the second processing state satisfies the processing state criterion.

18. The non-transitory computer-readable medium of claim 14, wherein the first set of processing devices comprises a first processing unit of the computing system and the second set of processing devices comprises at least one of a second processing unit of the computing system that is separate from the first processing unit or a third processing unit of a processing system that is remote from the computing system.

\* \* \* \* \*